US012750084B2

(12) United States Patent
Hajir et al.

(10) Patent No.: US 12,750,084 B2
(45) Date of Patent: Sep. 29, 2026

(54) SYSTEMS AND METHODS FOR ADAPTIVE SELECTION OF ESTIMATION TAPS

(71) Applicant: Samsung Electronics Co., Ltd., Suwon-si (KR)

(72) Inventors: Mouna Hajir, San Diego, CA (US); Mojtaba Rahmati, San Diego, CA (US); Hyuk Joon Kwon, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/391,497

(22) Filed: Dec. 20, 2023

(65) Prior Publication Data

US 2025/0141488 A1 May 1, 2025

Related U.S. Application Data

(60) Provisional application No. 63/545,896, filed on Oct. 26, 2023.

(51) Int. Cl.
*H04B 1/525* (2015.01)
*H04B 1/12* (2006.01)

(52) U.S. Cl.
CPC ............... *H04B 1/525* (2013.01); *H04B 1/12* (2013.01)

(58) Field of Classification Search
CPC ........... H04L 25/03044; H04L 25/0216; H04L 25/0224; H04L 27/26; H04L 7/0058; H04L 25/0212; H04L 5/1461; H04L 25/03292; H04L 25/0218; H04L 2025/03509; H04L 27/01; H04L 2025/03426; H04L 25/03006; H04L 25/03012; H04L 25/021; H04L 25/0242; H04L 1/06; H04L 25/0204; H04L 25/022; H04L 25/0226; H04L 25/0228;
(Continued)

(56) References Cited

U.S. PATENT DOCUMENTS 7,130,293 B2 10/2006 Hanada et al.
7,250,906 B2 7/2007 Goren et al.
(Continued)

FOREIGN PATENT DOCUMENTS

WO WO-2008151983 A1 * 12/2008 ............. H04B 1/712

*Primary Examiner* — Golam Sorowar
(74) *Attorney, Agent, or Firm* — Womble Bond Dickinson (US) LLP

(57) ABSTRACT

A system includes: a first transmitter to transmit a first signal; a second transmitter to transmit a second signal; a receiver to receive a downlink signal, the downlink signal including a desired signal and an interference signal corresponding to the first and second signals; a processor; and memory including instructions that, when executed by the processor, cause the processor to: select an interference function based on center frequencies of the first and second transmitters and the receiver; calculate correlation values based on a first delay between the receiver and a reference transmitter, and a second delay between the first and second transmitters; select one or more filter taps based on the calculated correlation values; estimate the interference signal based on the selected one or more filter taps and the interference function; determine the desired signal from the downlink signal according to the estimated interference signal; and transmit the desired signal.

20 Claims, 16 Drawing Sheets

(58) Field of Classification Search

CPC ............ H04L 25/03178; H04B 7/0413; H04B 1/7117; H04B 1/712; H04B 7/0848; H04B 7/0854; H04B 2201/709727; H04B 7/005; H04B 1/525; H04B 1/7115; H04B 7/0634; H04B 1/44; H04B 1/48; H04B 1/709; H04B 15/00; H04B 7/0845; H04B 1/71057; H04B 7/0669; H04B 7/0673; H04B 7/0874; H04B 17/336; H04B 1/1027; H04B 2001/1054; H04B 1/10; H04B 1/7113

See application file for complete search history.

(56) References Cited

U.S. PATENT DOCUMENTS

| | | | | |
|---|---|---|---|---|
| 7,869,527 | B2 * | 1/2011 | Vetter | H04L 27/366 375/259 |
| 8,718,178 | B1 * | 5/2014 | Carbone | H03F 1/3241 375/296 |
| 9,252,834 | B2 | 2/2016 | Seller et al. | |
| 9,647,705 | B2 * | 5/2017 | Pack | H04B 1/713 |
| 12,490,291 | B2 * | 12/2025 | Rao | H04W 72/542 |
| 2003/0165206 | A1 | 9/2003 | Karr | |
| 2004/0240588 | A1 | 12/2004 | Miller | |
| 2017/0293027 | A1 * | 10/2017 | Stark | G01S 13/87 |
| 2018/0048347 | A1 | 2/2018 | Kim et al. | |

* cited by examiner

300

| | | |
|---|---|---|
| IMD2 | $f_{tx,1} + f_{tx,2} = f_{rx}$ | $x(t)=x_1(t) . x_2(t)$ |
| | $f_{tx,1} - f_{tx,2} = f_{rx}$ | $x(t)=x_1(t) \cdot x_2^*(t)$ |
| IMD3 | $f_{tx,1} - 2f_{tx,2} = f_{rx}$ | $x(t)=x_1(t) \cdot \{x_2^*(t)\}^2$ |
| | $f_{tx,1} + 2f_{tx,2} = f_{rx}$ | $x(t)=x_1(t) \cdot x_2^2(t)$ |
| | $2f_{tx,1} - f_{tx,2} = f_{rx}$ | $x(t)=x_1^2(t) \cdot x_2^*(t)$ |
| | $2f_{tx,1} + f_{tx,2} = f_{rx}$ | $x(t)=x_1^2(t) \cdot x_2(t)$ |

FIG. 3

SYSTEMS AND METHODS FOR ADAPTIVE SELECTION OF ESTIMATION TAPS

CROSS-REFERENCE TO RELATED APPLICATION(S)

This application claims priority to and the benefit of U.S. Provisional Application No. 63/545,896, filed on Oct. 26, 2023, entitled "ADAPTIVE SELECTION OF ESTIMATION TAPS FOR SELF-INTERFERENCE CANCELATION IN SIMULTANEOUS RECEIVING AND TRANSMITTING SYSTEMS," the entire content of which is incorporated by reference herein.

BACKGROUND

1. Field

Aspects of embodiments of the present disclosure are directed to self-interference cancelation systems and methods.

2. Description of Related Art

In simultaneous receiving and transmitting systems, signals can be received and transmitted at the same time with each other, for example, on different bands from each other if a receiving band is different from a transmitting band. In such systems, when there is a transmission on an uplink and a reception on a downlink, the uplink transmission may interfere with a received signal on the downlink reception.

The above information disclosed in this Background section is for enhancement of understanding of the background of the present disclosure, and therefore, it may contain information that does not constitute prior art.

SUMMARY

Embodiments of the present disclosure are directed to systems and methods for adaptive selection of estimation taps for self-interference cancelation.

According to one or more embodiments of the present disclosure a system includes: a first transmitter configured to transmit a first signal; a second transmitter configured to transmit a second signal; a receiver configured to receive a downlink signal, the downlink signal comprising a desired signal and an interference signal corresponding to the first signal and the second signal; a processor; and memory including instructions that, when executed by the processor, cause the processor to: select an interference function based on center frequencies of the first transmitter, the second transmitter, and the receiver; calculate correlation values based on a first delay between the receiver and a reference transmitter from among the first and second transmitters, and a second delay between the first and second transmitters; select one or more filter taps based on the calculated correlation values; estimate the interference signal based on the selected one or more filter taps and the interference function; determine the desired signal from the downlink signal according to the estimated interference signal; and transmit the desired signal.

In an embodiment, the calculated correlation values may be stored in a 2D structure, and the stored correlation values may be used by the processor to select the one or more filter taps.

In an embodiment, the 2D structure may include: a plurality of first time delay offset candidates for the first delay between the receiver and the reference transmitter along a first axis; a plurality of second time delay offset candidates for the second delay between the first and second transmitters along a second axis; and a correlation value from among the calculated correlation values for each pair of the first and second time delay offset candidates.

In an embodiment, to generate the 2D structure, the instructions may further cause the processor to: calculate the correlation values for a plurality of first time delay offset candidates stored in a first buffer based on one second time delay offset candidate stored in a second buffer for a first time instance; determine a current peak correlation value from among the calculated correlation values for the first time instance; compare a difference between the current peak correlation value for the first time instance and a previous correlation value stored in the 2D structure for a previous time instance with a threshold; and store the current peak correlation value in the 2D structure based on the compare.

In an embodiment, in response to a determination that the difference is greater than the threshold, the 2D structure may be reset, and at least the current peak correlation value may be stored in the 2D structure; and in response to a determination that the difference is less than the threshold, the current peak correlation value may be added to the 2D structure including at least the previous correlation value.

In an embodiment, to select the one or more filter taps, the instructions may further cause the processor to: identify n number of strongest correlation values from the 2D structure, where n may be a natural number; determine tap indices of the n number of strongest correlation values; select terms for the interference function based on the tap indices; estimate channel coefficients based on the tap indices and the selected terms; and estimate the interference signal based on the estimated channel coefficients.

In an embodiment, to select the one or more filter taps, the instructions may further cause the processor to: identify a peak correlation value from the 2D structure; select a first pattern of a group of taps including a peak tap corresponding to the peak correlation value at the center of the first pattern of the group of taps, select a second pattern of a group of taps including the peak tap corresponding to the peak correlation value at the center of the second pattern of the group of taps; calculate a sum of the correlation values of the group of taps for each of the first pattern and the second pattern; and select the one or more filter taps based on the sum of the correlation values.

According to one or more embodiments of the present disclosure, a method includes: selecting an interference function based on center frequencies of a first transmitter configured to transmit a first signal, a second transmitter configured to transmit a second signal, and a receiver configured to receive a downlink signal, the downlink signal including a desired signal and an interference signal corresponding to the first signal and the second signal; calculating correlation values based on a first delay between the receiver and a reference transmitter from among the first and second transmitters, and a second delay between the first and second transmitters; selecting one or more filter taps based on the calculated correlation values; estimating the interference signal based on the selected one or more filter taps and the interference function; determining the desired signal from the downlink signal according to the estimated interference signal; and transmitting the desired signal.

In an embodiment, the method may further include storing the calculated correlation values in a 2D structure, and the stored correlation values may be used for the selecting of the one or more filter taps.

In an embodiment, the 2D structure may include: a plurality of first time delay offset candidates for the first delay between the receiver and the reference transmitter along a first axis; a plurality of second time delay offset candidates for the second delay between the first and second transmitters along a second axis; and a correlation value from among the calculated correlation values for each pair of the first and second time delay offset candidates.

In an embodiment, to generate the 2D structure, the method may further include: calculating the correlation values for a plurality of first time delay offset candidates stored in a first buffer based on one second time delay offset candidate stored in a second buffer for a first time instance; determining a current peak correlation value from among the calculated correlation values for the first time instance; comparing a difference between the current peak correlation value for the first time instance and a previous correlation value stored in the 2D structure for a previous time instance with a threshold; and storing the current peak correlation value in the 2D structure based on the comparing.

In an embodiment, in response to a determination that the difference is greater than the threshold, the 2D structure may be reset, and at least the current peak correlation value may be stored in the 2D structure; and in response to a determination that the difference is less than the threshold, the current peak correlation value may be added to the 2D structure including at least the previous correlation value.

In an embodiment, the selecting the one or more filter taps may include: identifying n number of strongest correlation values from the 2D structure, where n may be a natural number; determining tap indices of the n number of strongest correlation values; selecting terms for the interference function based on the tap indices; estimating channel coefficients based on the tap indices and the selected terms; and estimating the interference signal based on the estimated channel coefficients.

In an embodiment, the selecting of the one or more filter taps may include: identifying a peak correlation value from the 2D structure; selecting a first pattern of a group of taps including a peak tap corresponding to the peak correlation value at the center of the first pattern of the group of taps, selecting a second pattern of a group of taps including the peak tap corresponding to the peak correlation value at the center of the second pattern of the group of taps; calculating a sum of the correlation values of the group of taps for each of the first pattern and the second pattern; and selecting the one or more filter taps based on the sum of the correlation values.

According to one or more embodiments of the present disclosure, non-transitory computer readable medium is provided to store instructions that, when executed, cause a communication device to: select an interference function based on center frequencies of a first transmitter configured to transmit a first signal, a second transmitter configured to transmit a second signal, and a receiver configured to receive a downlink signal, the downlink signal including a desired signal and an interference signal corresponding to the first signal and the second signal; calculate correlation values based on a first delay between the receiver and a reference transmitter from among the first and second transmitters, and a second delay between the first and second transmitters; store the calculated correlation values in a 2D structure; select one or more filter taps based on the correlation values stored in the 2D structure; estimate the interference signal based on the selected one or more filter taps and the interference function; determine the desired signal from the downlink signal according to the estimated interference signal; and transmit the desired signal.

In an embodiment, the 2D structure may include: a plurality of first time delay offset candidates for the first delay between the receiver and the reference transmitter along a first axis; a plurality of second time delay offset candidates for the second delay between the first and second transmitters along a second axis; and a correlation value from among the calculated correlation values for each pair of the first and second time delay offset candidates.

In an embodiment, to generate the 2D structure, the instructions may further cause the communication device to: calculate the correlation values for a plurality of first time delay offset candidates stored in a first buffer based on one second time delay offset candidate stored in a second buffer for a first time instance; determine a current peak correlation value from among the calculated correlation values for the first time instance; compare a difference between the current peak correlation value for the first time instance and a previous correlation value stored in the 2D structure for a previous time instance with a threshold; and store the current peak correlation value in the 2D structure based on the compare.

In an embodiment, to generate the 2D structure, the instructions may further cause the communication device to: in response to a determination that the difference is greater than the threshold, rest the 2D structure, and store at least the current peak correlation value in the 2D structure; and in response to a determination that the difference is less than the threshold, add the current peak correlation value to the 2D structure including at least the previous correlation value.

In an embodiment, to select the one or more filter taps, the instructions may further cause the communication device to: identify n number of strongest correlation values from the 2D structure, where n may be a natural number; determine tap indices of the n number of strongest correlation values; select terms for the interference function based on the tap indices; estimate channel coefficients based on the tap indices and the selected terms; and estimate the interference signal based on the estimated channel coefficients.

In an embodiment, to select the one or more filter taps, the instructions may further cause the communication device to: identify a peak correlation value from the 2D structure; select a first pattern of a group of taps including a peak tap corresponding to the peak correlation value at the center of the first pattern of the group of taps, select a second pattern of a group of taps including the peak tap corresponding to the peak correlation value at the center of the second pattern of the group of taps; calculate a sum of the correlation values of the group of taps for each of the first pattern and the second pattern; and select the one or more filter taps based on the sum of the correlation values.

BRIEF DESCRIPTION OF THE DRAWINGS

The above and other aspects and features of the present disclosure will be more clearly understood from the following detailed description of the illustrative, non-limiting embodiments with reference to the accompanying drawings, in which:

FIG. 3 illustrates a lookup table for kernel selection according to one or more embodiments of the present disclosure;

DETAILED DESCRIPTION

Figure 1:
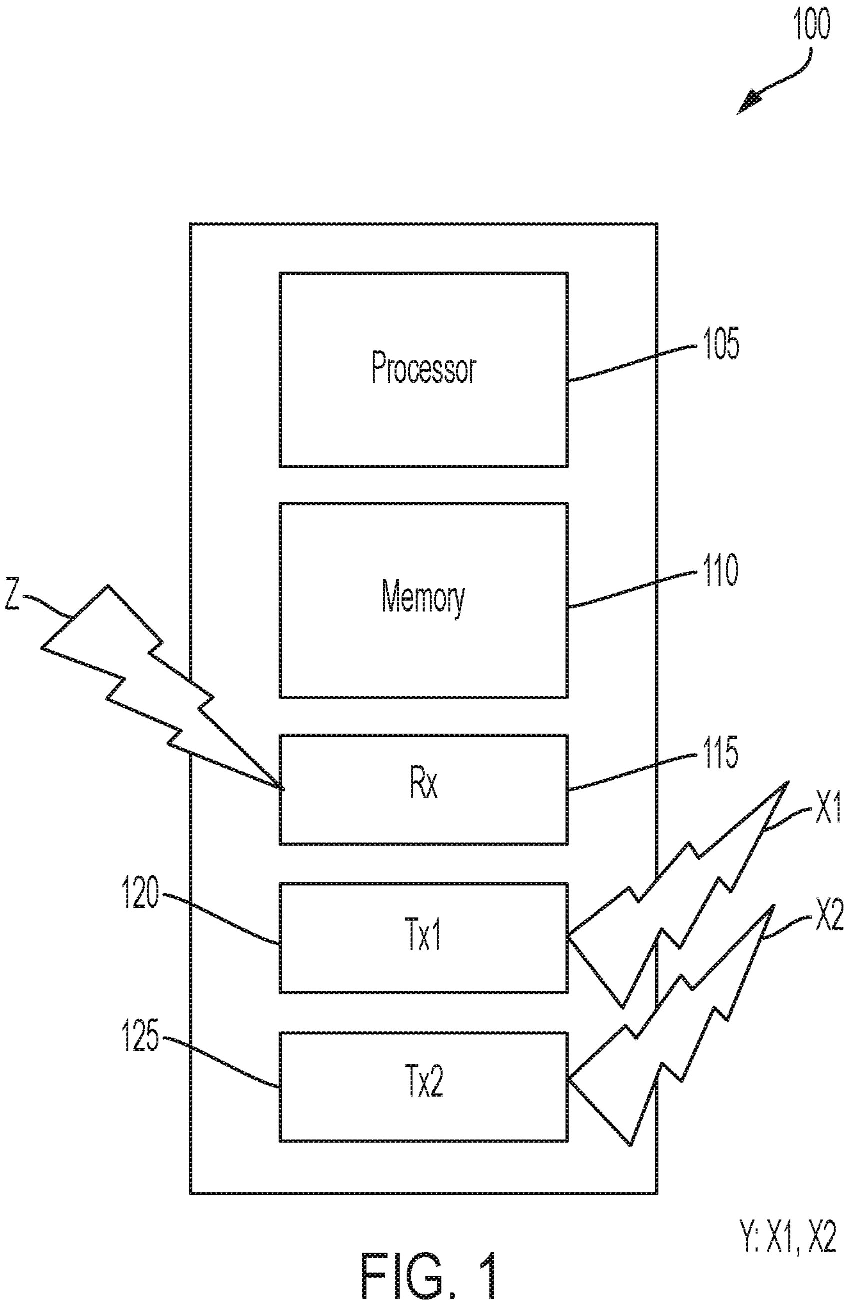
FIG. 1 illustrates a self-interference cancelation system according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

It will be understood that, although the terms “first,” “second,” “third,” etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being “on,” “connected to,” or “coupled to” another element or layer, it can be directly on, connected to, or coupled to the other element or layer, or one or more intervening elements or layers may be present. Similarly, when a layer, an area, or an element is referred to as being “electrically connected” to another layer, area, or element, it may be directly electrically connected to the other layer, area, or element, and/or may be indirectly electrically connected with one or more intervening layers, areas, or elements therebetween. In addition, it will also be understood that when an element or layer is referred to as being “between” two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms “a” and “an” are intended to include the plural forms as well, unless the context clearly indicates otherwise. It will be further understood that the terms “comprises,” “comprising,” “includes,” “including,” “has,” “have,” and “having,” when used in this specification, specify the presence of the stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. For example, the expression “A and/or B” denotes A, B, or A and B. Expressions such as “at least one of,” when preceding a list of elements, modify the entire list of elements and do not modify the individual elements of the list. For example, the expression “at least one of a, b, or c,” “at least one of a, b, and c,” and “at least one selected from the group consisting of a, b, and c” indicates only a, only b, only c, both a and b, both a and c, both b and c, all of a, b, and c, or variations thereof.

As used herein, the term “substantially,” “about,” and similar terms are used as terms of approximation and not as terms of degree, and are intended to account for the inherent variations in measured or calculated values that would be recognized by those of ordinary skill in the art. Further, the use of “may” when describing embodiments of the present disclosure refers to “one or more embodiments of the present disclosure.” As used herein, the terms “use,” “using,” and “used” may be considered synonymous with the terms “utilize,” “utilizing,” and “utilized,” respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In simultaneous receiving and transmitting systems, an uplink transmission may cause an interference or distortion in a downlink of a received signal. However, the impact of the interference or distortion caused on the received signal by the uplink transmission may not be accurately determined based simply on knowledge of what data is being sent in the uplink transmission or how an output signal (e.g., a transmitted signal) in the uplink transmission is constructed. For example, in the context of a handset, RF components (e.g., power amplifiers, duplexers, mixers, and the like) of the handset may interfere with a transmission path of the uplink transmission to introduce non-linearities that generate harmonics and noise. Further, temperature variations, vibrations, and the like may also have various effects on the uplink transmission.

Self-interference cancelation methods based on recursive least square (RLS) may enable the receiver to remove (e.g., filter) the interference or distortion in the received signal, so that a desired signal may be extracted from the received signal. For example, an adaptive filter (e.g., a finite impulse response (FIR) filter) may be used to remove (e.g., filter) the distortion from the received signal, such that the desired signal can be extracted. In this case, non-linear self-interference channel coefficients (e.g., taps or filter taps) of the common filter may be estimated recursively to determine suitable weights to be applied to an output signal of the uplink transmission (e.g., to minimize or reduce a weighted linear least squares cost function) according to an interference or distortion model, so that the filter may be configured to suitably filter or remove the interference or distortion from the received signal. The number of taps to be estimated may be an indication of the amount of memory required to implement the filters, the number of calculations required, and the amount of desired filtering. Generally, the more the number of taps to be estimated may mean more stopband attenuation, less ripples, narrower filters, and the like.

However, when there are two or more transmitters, each transmitting an output signal in the uplink transmission, one common filter alone may be unable to accurately estimate the distortion caused by the output signal of each of the two or more transmitters. Accordingly, in some embodiments, a filter (e.g., a FIR filter) may be used for each of the two or more output signals of the two or more transmitters, so that the interference or distortion caused by the transmitted output signals of the two or more transmitters in the uplink transmission may be suitably estimated and removed (e.g., filtered) from the received signal. In this case, the number of taps to be estimated may also be increased according to the increased number of filters.

However, not all of the taps may significantly contribute to the self-interference for each given time instance. Further, RLS algorithms and methods may typically require highly computational inversion calculations of matrixes, or alternatively, an iterative method with a high number of iterations and calculations. Accordingly, reducing the number of estimated taps may be desired to reduce the amount of computational resources used to estimate the interference or distortion from the received signal.

Embodiments of the present disclosure may provide systems and methods for selecting a reduced number of estimated taps (e.g., a subset of taps), without adversely affecting the performance of removing (e.g., filtering) the interference or distortion from a received signal. As such, according to embodiments, from among all of the estimated taps for all of the filters, a subset of estimated taps may be selected to estimate the interference or distortion on the received signal. Accordingly, computational resources may be reduced, while improving self-interference cancelation characteristics.

FIG. 1 illustrates a self-interference cancelation system according to one or more embodiments of the present disclosure.

Referring to FIG. 1, the system 100 may be any suitable system or device, such as a portable electronic device (e.g., a mobile phone, a smart phone, a tablet computer, a personal computer, a navigation device, a game console, an Internet of Things device, a wearable device, and/or the like), a mobile communication system, a base station, and/or the like, that transmits and receives signals simultaneously (e.g., at the same or substantially the same time) over one or more antennas. For example, the system 100 may include one or more processors 105 (hereinafter, referred to as a processor), memory 110, a receiver (Rx) 115, and at least two transmitters (T×1 and T×2) 120 and 125. The receiver 115 may receive a downlink signal (e.g., a received signal) Z. For example, in the context of a handset (e.g., a UE), the downlink signal Z may be received from a base station (e.g., a gNB), for example, such as a Physical Data Shared Channel (PDSCH) signal or Physical Downlink Control Channel (PDCCH) signal. A first transmitter 120 may transmit a first output signal X1 and a second transmitter 125 may transmit a second output signal X2, which may be combined with each other in a transmitted uplink signal Y. The received signal Z and the uplink signal Y may be transmitted and received at the same or substantially at the same time with each other, such that the uplink signal Y including the first and second output signals X1 and X2 may cause an interference or a distortion in the received signal Z.

As a representative example, the first transmitter 120 may transmit the first output signal X1 over a first transmission path (e.g., a first antenna), and the second transmitter 125 may transmit the second output signal X2 over a second transmission path (e.g., a second antenna) different from the first transmission path. Accordingly, the first output signal X1 and the second output signal X2 may be output in the uplink signal Y at the same or substantially the same time as each other or at different times from each other via the different transmission paths, and thus, may experience interference or distortion from the RF components of the system 100 differently from each other. The receiver 115 may receive the received signal Z over a reception path at any time, even during the transmission of the first output signal X1 and/or the second output signal X2 in the uplink signal Y. Accordingly, the transmission of the uplink signal Y including the first output signal X1 and/or the second output signal X2 may interfere with or distort the received signal Z.

For example, in some embodiments, the received signal Z may be defined as z[t] based on Equation (1) below.

$$z[t] = y[t] + d[t] + w[t] \quad \text{Equation (1)}$$

In Equation (1), for a time sample t, z[t] denotes the received signal Z, y[t] denotes the transmitted interfering signal (e.g., self-interfering signal) by the uplink signal Y, which may be an output of nonlinearity by the transmitters 120 and 125 for the time sample t, d[t] denotes the desired received baseband signal, and w[t] represents additive white Gaussian noise.

According to embodiments, as described in more detail below, the receiver 115 and/or the processor 105 may implement a transmitter-self-interference cancelation (TSIC) method to estimate the transmitted interfering signal y[t], and remove it (e.g., filter it) from the received signal z[t] before demodulation to extract the desired received baseband signal d[t]. Once the desired received baseband signal d[t] is extracted, it may be demodulated and decoded.

The processor 105 may be a general-purpose processor or a specific-purpose processor, an application specific integrated circuit (ASIC), one or more field programmable gate arrays (FPGAs), a group of processing components, or other suitable processing components. The processor 105 may be integrated within a single device or distributed across multiple separate systems, servers, or devices (e.g., computers). For example, the processor 105 may be an internal processor with respect to the system 100, or one or more of the processors may be an external processor, for example, implemented as part of one or more servers or as a cloud-based computing system. The processor 105 may be configured to execute computer code or instructions stored in the memory 110, and/or received from other computer readable media (e.g., CDROM, network storage, a remote server, and/or the like).

The memory 110 may include one or more devices (e.g., memory units, memory devices, storage devices, and/or the like) for storing data and/or computer code for performing and/or facilitating the various processes described in the present disclosure. The memory 110 may include random access memory (RAM), read-only memory (ROM), hard drive storage, temporary storage, non-volatile memory, flash memory, optical memory, or any other suitable memory for storing software objects and/or computer instructions. The memory 110 may include database components, object code components, script components, and/or any other kinds of information structures for supporting the various activities and information structures described in the present disclosure. The memory 110 may be communicably connected to the one or more processors via one or more processing circuits, and may include computer code for executing (e.g., by the one or more processors) one or more of the processes described herein.

While the processor 105 and the memory 110 are shown as separate components from the receiver 115, the first transmitter 120, and the second transmitter 125, the present disclosure is not limited thereto, and the processor 105 and/or the memory 110 may be a part of at least the receiver 115. For example, the processor 105 may be implemented as one or more integrated circuits of the receiver 115, or as one or more integrated circuits of a transceiver that includes at least the receiver 115. As such, the various processes described hereinafter may be performed by the processor 105 and memory 110, by one or more integrated circuits of the receiver 115, or by one or more integrated circuits of a transceiver including at least the receiver 115.

Figure 2:
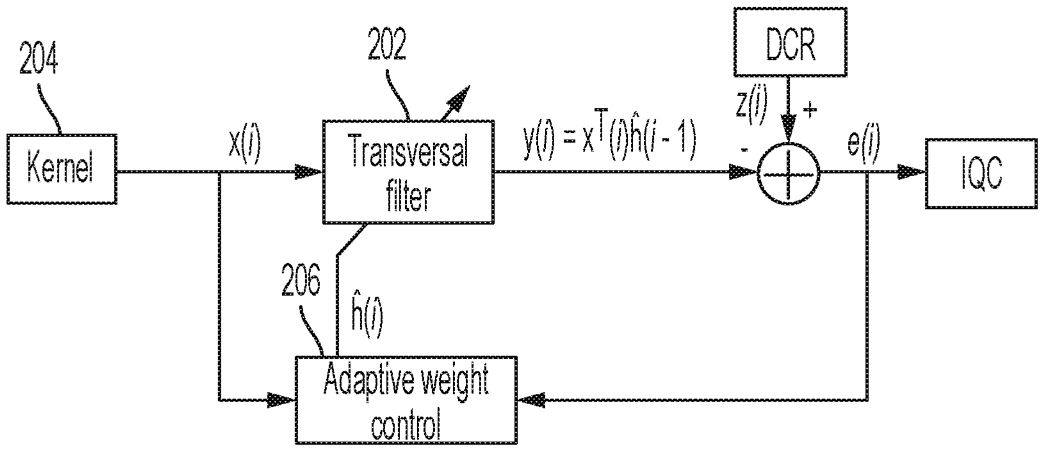
FIG. 2 illustrates a block diagram of a reception path of a receiver according to one or more embodiments of the present disclosure.

FIG. 2 illustrates a block diagram of a reception path of a receiver according to one or more embodiments of the present disclosure. FIG. 3 illustrates a lookup table for kernel selection according to one or more embodiments of the present disclosure.

Referring to FIG. 2, a transversal filter 202 may receive an input vector x(i) from a selected kernel 204, and a weight vector $\hat{h}(i)$ from an adaptive weight control 206 to output a transmitted signal y(i) (e.g., an uplink signal) according to a weighted interference function. For example, the weighted interference function for defining the transmitted signal y(i) may be based on Equation (2) below.

$$y(i) = x^T(i)\hat{h}(i-1) \qquad \text{Equation (2)}$$

As shown in Equation (2) with reference to FIG. 2, at each time instance, the input vector x(i) (e.g., the transpose thereof) may be weighted by the weight vector $\hat{h}(i-1)$ to output the transmitted signal y(i), which is then compared to the received signal z(i). In this case, the input vector x(i) may refer to a vector of non-linear components of the selected kernel 204, which may be known for each model of interference (e.g., see FIG. 3), and the received signal z(i) may be the received signal Z that contains both the desired signal d[t] and the interference signal y[t] as well as noise at sample index i.

Referring to FIGS. 2 and 3, in some embodiments, the kernel 204 may be selected based on an interference model, such as Intermodulation 2 (IMD2) and/or Intermodulation 3 (IMD3), when at least two transmitters are used for the uplink transmission. The interference model may be determined based on center frequencies of the received signal and the transmitted signals according to a lookup table 300. For example, when at least two output signals X1 and X2 (e.g., including sample signals $X_1(t)$ and $X_2(t)$ for each time instance t, respectively) are transmitted by the at least two transmitters 120 and 125, each of the output signals X1 and X2 may be transmitted over a corresponding frequency f. The received signal Z may also be received over a corresponding frequency f. Based on the center frequency $f_{rx}$ of the received signal Z, the center frequency $f_{tx,1}$ of the first output signal X1, and the center frequency $f_{tx,2}$ of the second output signal X2, a suitable kernel 204 may be selected to provide the input vector x(i) according to an interference function x(t) for the corresponding interference model (e.g., the intermodulation IMD2/IMD3 distortion) of the selected kernel 204.

In other words, the input vector x(i) may be provided from a selected kernel 204 as an interference function x(t) of the samples of the first and second output signals X1 and X2 of the first and second transmitters 120 and 125 as shown in the right side of the lookup table 300. The selected kernel 204 may be determined based on the center frequency $f_{rx}$ of the received signal Z (e.g., the receiver 115), the center frequency $f_{tx,1}$ of the first output signal X1 (e.g., the first transmitter 120), and the center frequency $f_{tx,2}$ of the second output signal X2 (e.g., the second transmitter 125) as shown in the left side of the lookup table 300.

For example, as shown in the left side of the lookup table 300 in FIG. 3, if the center frequency $f_{tx,1}$ of the first output signal X1 plus the center frequency $f_{tx,2}$ of the second output signal X2 is equal to the center frequency $f_{rx}$ of the received signal Z, then the first line 305 of the lookup table 300 may be used to select a first kernel 204 (and thus, the interference function x(t)) corresponding to IMD2 from the first line 305 of the right side of the table 300. In this case, as shown in the right side of the table 300, the selected kernel 204 may provide the input vector x(i) as an interference function x(t) of the direct product between the first output signal X1 and the second output signal X2 for each sample t (e.g., $x(t)=x_1(t)x_2(t)$). As another example, if the center frequency $f_{tx,1}$ of the first output signal X1 plus twice the center frequency $f_{tx,2}$ of the second output signal X2 is equal to the center frequency $f_{rx}$ of the received signal Z, then the fourth line 320 of the lookup table 300 may be used to select a fourth kernel 204 corresponding to IMD3, such that the input vector x(i) may be provided by the selected kernel 204 as an interference function x(t) of the product between the first output signal X1 (e.g., $x_1(t)$) and a square of the second output signal X2

$$(\text{e.g, } x_2^2(t))$$

for each sample t $$(\text{e.g., } x(t) = x_1(t)x_2^2(t)).$$

On the other hand, in some embodiments, if the center frequencies $f_{rx}$, $f_{tx,1}$, $f_{tx,2}$ of the received signal Z, the first output signal X1, and the second output signal X2 do not match those on the left side of the lookup table 300, then no interference or distortion in the received signal Z may be inferred.

Once the interference function x(t) of the input vector x(i) is determined, the corresponding weight vector $\hat{h}(i-1)$ may be estimated recursively to calculate the transmitted signal y(i) as a product between the transpose of the input vector x(i) and the weight vector $\hat{h}(i-1)$. After the transmitted signal y(i) is estimated, it may be compared with the received signal z(i) to extract the desired received baseband signal d[t] as shown in Equation (1) above.

A tap may be a function of the number of samples t being considered for the input vector x(i) and the weight vector $\hat{h}(i-1)$. The size of the weight vector $\hat{h}(i-1)$ is a function of the input vector x(i), and the size of the input vector x(i) may be M×N (e.g., a function of the lengths of FIR filters w and v shown in FIG. 5B, or in other words, the taps thereof). In other words, one tap may correspond to one element (e.g., one channel coefficient) of the input vector x(i) and may also correspond to one element (e.g., one channel coefficient) of the weight vector $\hat{h}(i-1)$. For example, the input vector x(i) and the weight vector $\hat{h}(i-1)$ may have a sample size corresponding to a length, or in other words, the impulse response of the sample signal. As the impulse response of the sample signal increases, the sample size of the input vector x(i) and the weight vector $\hat{h}(i-1)$ may be increased, and thus, the number of channel coefficients (e.g., the taps) of each of the input vector x(i) and the weight vector $\hat{h}(i-1)$ may be increased. In some embodiments, the input vector x(i) and the weight vector $\hat{h}(i-1)$ may have the same sample size as each other, but the present disclosure is not limited thereto. As such, the number of channel coefficients (e.g., the taps) to be estimated may depend on the length of the sample signal.

Further, as described in more detail with reference to FIGS. 4, 5A, and 5B as the number of filters used to filter the interference or distortion on the received signal increases, the number of taps to be estimated for the filters may be increased.

Figure 4:
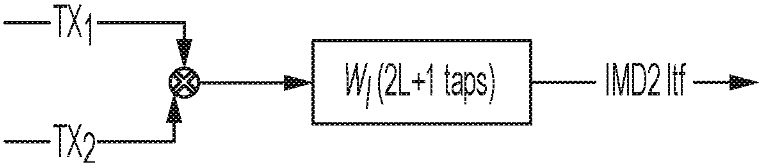
FIG. 4 illustrates a filter structure for a received signal according to a comparative example.

FIG. 4 illustrates a filter structure for a received signal according to a comparative example. FIGS. 5A and 5B illustrate filter structures for a received signal according to one or more embodiments of the present disclosure.

Referring to FIG. 4, in a comparative example, a single common filter $w_l$ is used to remove (e.g., filter) the distortion on a received signal from two transmitted output signals $TX_1$ and $TX_2$ to determine an IMD2 interference, so that the length, or in other words, the number of taps to estimate for the single common filter $w_l$ is 2 L+1. As a representative example, if L is equal to 2, then the number of taps to estimate in the comparative example may be equal to 5. Assuming a single output transmission $x_1$ (e.g., IIP2 distortion), the 5 taps to estimate may be simply defined as $x_1[-2]$; $x_1[-1]$; $x_1[0]$; $x_1[1]$; $x_1[2]$.

However, when the two transmitted output signals $TX_1$ and $TX_2$ are decoupled signals so that they experience their own separate frequency response from the RF components (e.g., power amplifier, duplexer, and the like) of the system 100, the single common filter $w_l$ may be unable to accurately track the impulse response of each of the two output signals $TX_1$ and $TX_2$, and thus, may not be able to accurately estimate and remove (e.g., filter) the interference or distortion therefrom from the received signal. For example, if the transmitters 120 and 125 transmit the output signals X1 and X2 through their own separate antennas of the system 100, such that each of the output signals X1 and X2 travel through its own path to experience distortion within the system 100 differently, then the single common filter $w_l$ may not be able to sufficiently remove (e.g., filter) such distortion from the received signal.

Figure 5A:
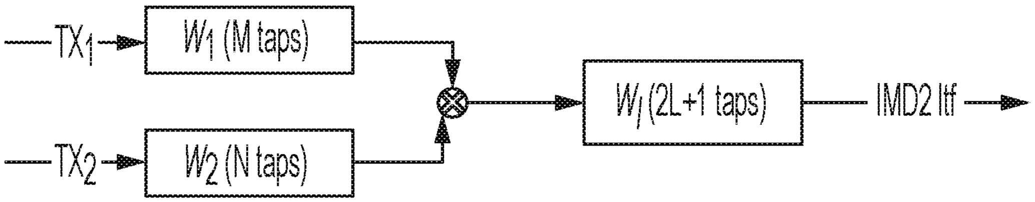
FIGS. 5A and 5B illustrate filter structures for a received signal according to one or more embodiments of the present disclosure.

Referring to FIG. 5A, to improve tracking of the input response of each transmitted signals $TX_1$ and $TX_2$, a filter (e.g., a finite impulse response (FIR) filter) may be considered for each transmitter 120 and 125, such that M number of taps may be estimated for a first filter $w_1$ of the first transmitter 120 and N number of taps may be estimated for a second filter $w_2$ of the second transmitter 125, where M and N are each integers greater than 1.

In this case, assuming the kernel is selected for the direct product interference function x(t) for IMD2 (e.g., $x(t)=x_1(t)x_2(t)$) shown in FIG. 3, the self-interfering signal y[t] at time sample t may be defined by Equation (3) below.

$$y[t] = \sum_{l=-L}^{L} \sum_{i=-\frac{M-1}{2}}^{\frac{M-1}{2}} \sum_{j=-\frac{N-1}{2}}^{\frac{N-1}{2}} w_l w_{1,i} w_{2,j} x_1[t-l-i] x_2[t-l-j] = \sum_{l=-L}^{L} \sum_{i=-\frac{M-1}{2}}^{\frac{M-1}{2}} \sum_{j=-\frac{N-1}{2}}^{\frac{N-1}{2}} c_{l+i,l+j} x_1[t-l-i] x_2[t-l-j] \qquad \text{Equation (3)}$$

In Equation (3), $w_l$, (l=−L, . . . , L) are the nonlinear self-interference channel coefficients (e.g., taps) for the common filter $w_l$, $w_{l,i}$, (i=0, . . . , M) are the nonlinear self-interference channel coefficients (e.g., taps) for the first filter $w_1$ of the first transmitter 120, and $w_{2,j}$, (j=0, . . . , N) are the nonlinear self-interference channel coefficients (e.g., taps) for the second filter $w_2$ of the second transmitter 125. $x_1[t]$, $x_2[t]$ are the baseband uplink signals from the transmitters 120 and 125 at the time sample t. y[t] is the resulting baseband non-linear interference (e.g., the self-interfering signal or the transmitted interfering signal). $c_{l+i,l+j}$ represents the total channel coefficients to be estimated through combination of the channel coefficients for the three filters above, with l, i, and j being tap indices for the channel coefficients (e.g., the taps) of the respective filters $w_l$, $w_1$, and $w_2$.

Returning to the representative example above with reference to FIG. 4, if M is equal to 5 and N is equal to 5, then there would be 125 number of taps to estimate (e.g., 5×5×5)

for the common filter $w_l$, the first filter $w_1$, and the second filter $w_2$. Accordingly, in some embodiments, the number of estimated taps may be increased according to the number of taps to be estimated for the common filter $w_l$, the number of taps to be estimated for the first filter $w_1$, and the number of taps to be estimated for the second filter $w_2$ according to Equation (3) above.

In some embodiments, estimating taps for all three filters may cause the number of computational resources needed for such estimations to be undesirably increased. Accordingly, in some embodiments, the number of estimated taps may be further reduced by reducing the number of filters, while still suitably estimating the transmitted interfering signal y[t] from the received signal Z.

Figure 5B:
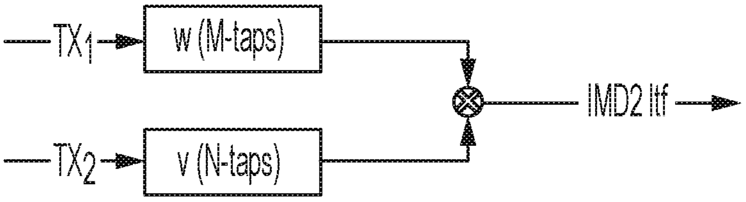

For example, referring to FIG. 5B, in some embodiments, the common filter $w_l$ may be inconsequential in tracking the distortion caused by each of the output signals X1 and X2. Accordingly, in some embodiments, the common filter $w_l$ may be omitted as needed or desired so that the number of filters may be reduced, and thus, the number of estimated taps may be reduced. In this case, a first filter (e.g., a finite impulse response (FIR) filter) w may be used to estimate and remove the interference or distortion that may be caused by the first transmitted signal TX1, and a second filter v may be used to estimate and remove the interference or distortion that may be caused by the second transmitted signal TX2. Still assuming the selected kernel 204 for the direct product interference function x(t) for IMD2 shown in FIG. 3, Equation (3) above may be simplified as shown in Equation (4) below.

$$y[t] = \sum_{i=-\frac{M-1}{2}}^{\frac{M-1}{2}} \sum_{j=-\frac{N-1}{2}}^{\frac{N-1}{2}} w_{,i} v_{,j} x_1[t-i] x_2[t-j] = \sum_{i=-\frac{M-1}{2}}^{\frac{M-1}{2}} \sum_{j=-\frac{N-1}{2}}^{\frac{N-1}{2}} c_{i,j} x_1[t-i] x_2[t-j] \qquad \text{Equation (4)}$$

In Equation (4), $$w_{,i}, \left(i = -\frac{M-1}{2}, \ldots, \frac{M-1}{2}\right)$$

are the nonlinear self-interference channel coefficients (e.g., taps) for the first filter w of the first transmitter 120 and $v_{,j}$, $$\left(j = -\frac{N-1}{2}, \ldots, \frac{N-1}{2}\right)$$

are the nonlinear self-interference channel coefficients (e.g., taps) for the second filter v of the second transmitter 125. $x_1[t]$, $x_2[t]$ are the baseband uplink signals from the transmitters 120 and 125 at the time sample t. y[t] is the resulting baseband non-linear interference (e.g., the self-interfering signal or the transmitted interfering signal). $c_{i,j}$ represents the total channel coefficients to be estimated through combination of the channel coefficients for the two filters above, with i and j being tap indices for the channel coefficients (e.g., the taps) of the respective filters w and v.

In this case, as shown in Equation (4), the number of taps to be estimated for the common filter $w_l$ based on Equation (3) above may be equal to 0, such that the total number of taps to be estimated for the first and second filters w and v based on Equation (4) may be reduced to M×N, or in other words, the number of channel coefficients $c_{i,j}$ to estimate may be reduced to an order of M×N for IMD2, for example. Thus, as a representative example, assuming that M equals 5 and N equals 5, the number of estimated taps may be reduced to 25 taps (when considering cross-terms) for IMD2 interference, and 75 taps to estimate for IMD3 interference. For example, still assuming the direct product function x(t) for the IMD2 interference, the 25 taps to be estimated (when considering the cross-terms) may be defined by $x_1[-2]x_2[-2]$; $x_1[-2]x_2[-1]$; $x_1[-2]x_2[0]$; $x_1[-2]x_2[1]$; $x_1[-2]x_2[2]$; $x_1[-1]x_2[-2]$; . . . ; $x_1[-1]x_2[2]$; $x_1[0]x_2[-2]$; . . . ; $x_1[0]x_2[2]$; $x_1[1]x_2[-2]$; . . . ; $x_1[2]x_2[2]$.

However, not all the taps may significantly contribute to the self-interference for each given time instance t, and thus, according to one or more embodiments, the number of estimated taps may be further reduced by selecting a subset of taps from among the total number of estimated taps (e.g., M×N for IMD2) for the filters w and v, or in other words, to select a subset of the length of the input vector x(i) for the estimation of the corresponding weight vector $\hat{h}(i-1)$. The subset of estimated taps may be used to estimate the transmitted interfering signal y[t] to extract the desired signal from the received signal.

According to one or more embodiments of the present disclosure, the subset of taps may be selected according to correlation values (e.g., cross-correlation values) calculated based on delays between the transmitters 120 and 125 and the receiver 125. For example, there may be a delay (e.g., a first time delay or an absolute delay) between the reception of the received signal Z and the transmission of an output signal (e.g., a transmitted signal) that distorted the received signal Z. Further, because there are two transmitters 120 and 125, there may be a delay (e.g., a second time delay or a relative delay) between the first output signal X1 and the second output signal X2 that distorted the received signal Z. Thus, to determine how many samples (e.g., time samples t) may have passed between a time instance of a transmission of the output signals X1 and X2 and a time instance of a the reception of the received signal Z, a synchronization may be performed between the received signals and the transmitted signals, for example, by correlating a large vector of transmitted signals from the transmitters 120 and 125 with a large vector of received signals by the receiver 115, such as through a product (e.g., a multiplication) of the samples in the vectors of the transmitted and received signals.

The correlation values may be calculated for a plurality of first and second delay offset pair candidates to determine a first offset (e.g., an absolute offset) corresponding to the first delay (e.g., the absolute delay) between a reference transmitter from among the first and second transmitters 120 and 125 and the receiver 115, and a second offset (e.g., a relative offset) corresponding to the second delay (e.g., the relative delay) between the first and second transmitters 120 and 125. The correlation value calculated for each first and second delay offset pair candidate may represent the power of one specific tap (e.g., filter tap). Accordingly, the first and second delay offset pair candidate(s) having the strongest (e.g., largest) correlation value in terms of magnitude may indicate that the corresponding tap contributes strongly to the self-interference, and thus, should be used in the estimation of the transmitted interfering signal y[t].

For example, to estimate the transmitted interfering signal y[t] according to the first and second time delays, Equation (4) above may be rewritten as Equation (5) below.

$$y[t]=\sum\sum w[i]v[j]x_1[t-\Delta t_0+i]x_2[t-\Delta t_0-\Delta t_1+j]+n(t) \quad \text{Equation (5)}$$

In Equation (5), $\Delta t_0$ represents the first time delay (e.g., the absolute delay) between the reference transmitter from among the first and second transmitters 120 and 125 and the receiver 115, $\Delta t_1$ represents the second time delay (e.g., the relative delay) between the first and second transmitters 120 and 125, and w and v represent the filters (e.g., the FIR filters) representing the frequency responses of the first and second transmitters 120 and 125, respectively. Further, n(t) represents the noise vector at the receiver.

The correlation value for each first and second delay offset pair candidate (e.g., for each particular first and second time delay $\Delta t_0$ and $\Delta t_1$ combination) at a time sample t may be calculated based on a first correlation (e.g., a direct correlation) according to Equation 6 below, when the kernel 204 is selected for the direct product interference function x(t) for IMD2 shown in FIG. 3.

$$\mathrm{Corr}(\Delta t_0+i,\Delta t_1+j)\approx E\{y[t](x_1[t-\Delta t_0+i]x_2[t-\Delta t_0-\Delta t_1+j])^*\}\approx w[i]v[j] \quad \text{Equation (6)}$$

As shown in Equation (6), by calculating the correlation value (e.g., the first or direct correlation value) for each first and second delay offset pair candidate (e.g., for each particular combination of $\Delta t_0$ and $\Delta t_1$), the power contribution w[i]v[j] of a particular tap having a particular combination of tap indices i and j may be determined. Thus, by calculating the correlation values based on the time delays $\Delta t_0$ and $\Delta t_1$, those taps (e.g., tap indices i and j) that are deemed to have the strongest (e.g., the largest) power contributions w[i]v[j] according to Equation 6 above may be selected for estimating the transmitted interfering signal y[t] based on Equation (5) above. In other words, the larger the correlation value (e.g., in terms of magnitude) of a corresponding tap having a particular combination of tap indices i and j in w[i]v[j] for a particular combination of time delays $\Delta t_0$ and $\Delta t_1$, the more important the corresponding tap is in estimating the transmitted interfering signal y[t].

While the correlation values calculated according to Equation (6) above may be used to determine the tap indices i and j according to an interference function x(t) for IMD2, it does not allow for the determination of a third tap index k for an interference function x(t) for a selected IMD3 kernel 204. For example, assuming that the kernel 204 is selected for the fourth interference function x(t) for IMD3 in FIG. 3

$$(\text{e.g., } x(t)=x_1(t)x_2^2(t)),$$

due to the squared-term of X2

$$(\text{e.g., } x_2^2(t)),$$

the transmitted interfering signal y[t] may be defined based on Equation (7) below.

$$y[t]=\sum w[i]x_1[t-\Delta t_0+i]\sum v[j]x_2[t-\Delta t_0-\Delta t_1+j]\sum v[k]x_2[t-\Delta t_0-\Delta t_1+k]+n(t) \quad \text{Equation (7)}$$

In this case, the different tap index candidates for i and j may be determined based on Equation (8) below.

$$\mathrm{Corr}(\Delta t_0+i,\Delta t_1+j)\approx E\{y[t](x_1[t-\Delta t_0+i]x_2^2[t-\Delta t_0-\Delta t_1+j])^*\}\approx w[i]v^2[j] \quad \text{Equation (8)}$$

As shown in Equation (8), while the power contribution $w[i]v^2[j]$ of the tap indices i and j may be determined, Equation (8) does not allow for the third tap index k to be determined. As such, for IMD3 interference functions x(t), a second correlation (e.g., a product correlation) value may be calculated for different i, j, and k candidate values based on Equation (9) below.

$$\mathrm{Corr}(\Delta t_0+i,\Delta t_1+j)\times\mathrm{Corr}^*(\Delta t_0+i,\Delta t_1+k)\approx |w[i]|^2|v[j]|^2|v[k]|^2 \quad \text{Equation (9)}$$

As shown in Equation (9), for an IMD3 interference or distortion, the second correlation value (e.g., the product correlation value) provides an estimate of the power contribution $|w[i]|^2|v[j]|^2|v[k]|^2$ of a particular tap having a particular combination of tap indices i, j, and k for a particular combination of time delays $\Delta t_0$ and $\Delta t_1$.

As discussed in more detail below, once the correlation values (e.g., the first or second correlation values) are calculated based on the first and second delays (e.g., for each first and second delay offset pair candidate), the subset of taps may be selected according to one or more peak (e.g., maximum) correlation values from among the calculated correlation values.

Figure 6:
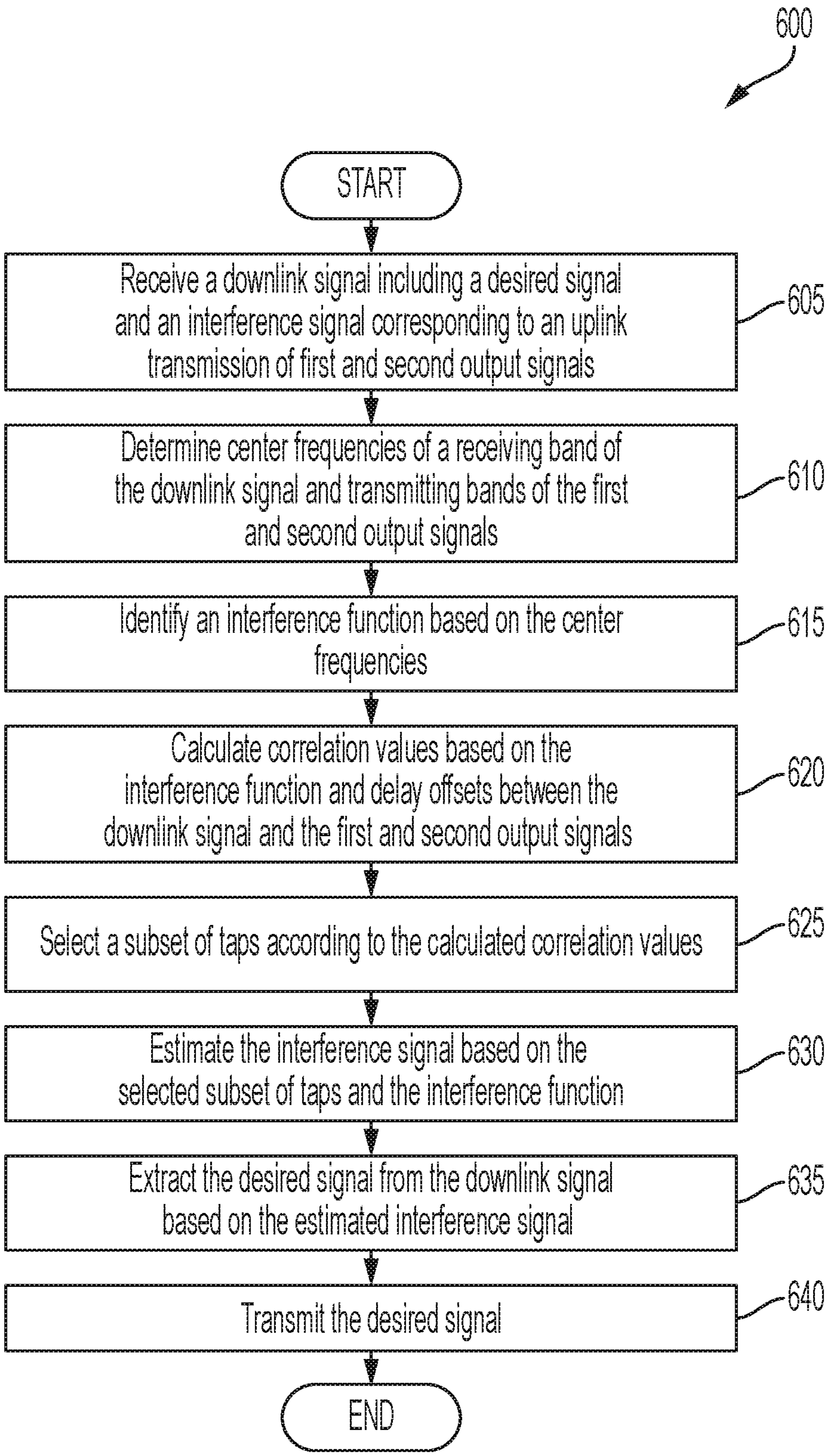
FIG. 6 is a flowchart of a method of extracting a desired signal from a received signal according to one or more embodiments of the present disclosure.

FIG. 6 is a flowchart of a method of extracting a desired signal from a received signal according to one or more embodiments of the present disclosure.

Referring to FIG. 6, the method 600 may start, and a downlink signal including a desired signal and an interference signal corresponding to an uplink transmission of first and second output signals may be received at block 605. In some embodiments, the downlink signal may correspond to the received signal Z defined based on Equation (1) above. For example, in some embodiments, the downlink signal Z may be received from a base station (e.g., a gNB), for example, such as a PDSCH signal or a PDCCH signal.

Center frequencies of a receiving band of the downlink signal and transmitting bands of the first and second output signals may be determined at block 610, and an interference function may be identified based on the center frequencies at block 615. For example, the center frequencies may be determined according to the left side of the table 300 shown in FIG. 3 to select a kernel for a suitable interference function x(t) for the first and second output signals X1 and X2 corresponding to an interference model (e.g., IMD2 or IMD3) according to the right side of the table 300 shown in FIG. 3.

Correlation values may be calculated based on the interference function and delay offsets between the downlink signal and the first and second output signals at block 620.

For example, the correlation values may be calculated for each first and second delay offset pair candidate (e.g., for each particular $\Delta t_0$ and $\Delta t_1$ combination) based on Equation (6) above (e.g., if an IMD2 interference) or based on Equations (8) and/or (9) above (e.g., if an IMD3 interference).

A subset of taps may be selected according to the calculated correlation values at block 625, and the interference signal may be estimated based on the selected subset of taps and the interference function at block 630. For example, the subset of taps may be selected based on one or more peak or maximum correlation values from among the calculated correlation values, as discussed in more detail below. The interference signal may correspond to the transmitted interfering signal y[t], and may be estimated according to Equation (5) or Equation (7) described above based on the correlation values and the first and second time delays $\Delta t_0$ and $\Delta t_1$.

The desired signal may be extracted from the downlink signal based on the estimated interference signal at block 635. The desired signal may be transmitted at block 640, and the method 600 may end. For example, the desired signal may be transmitted to a demodulator and/or decoder for demodulation and/or decoding.

Figure 7:
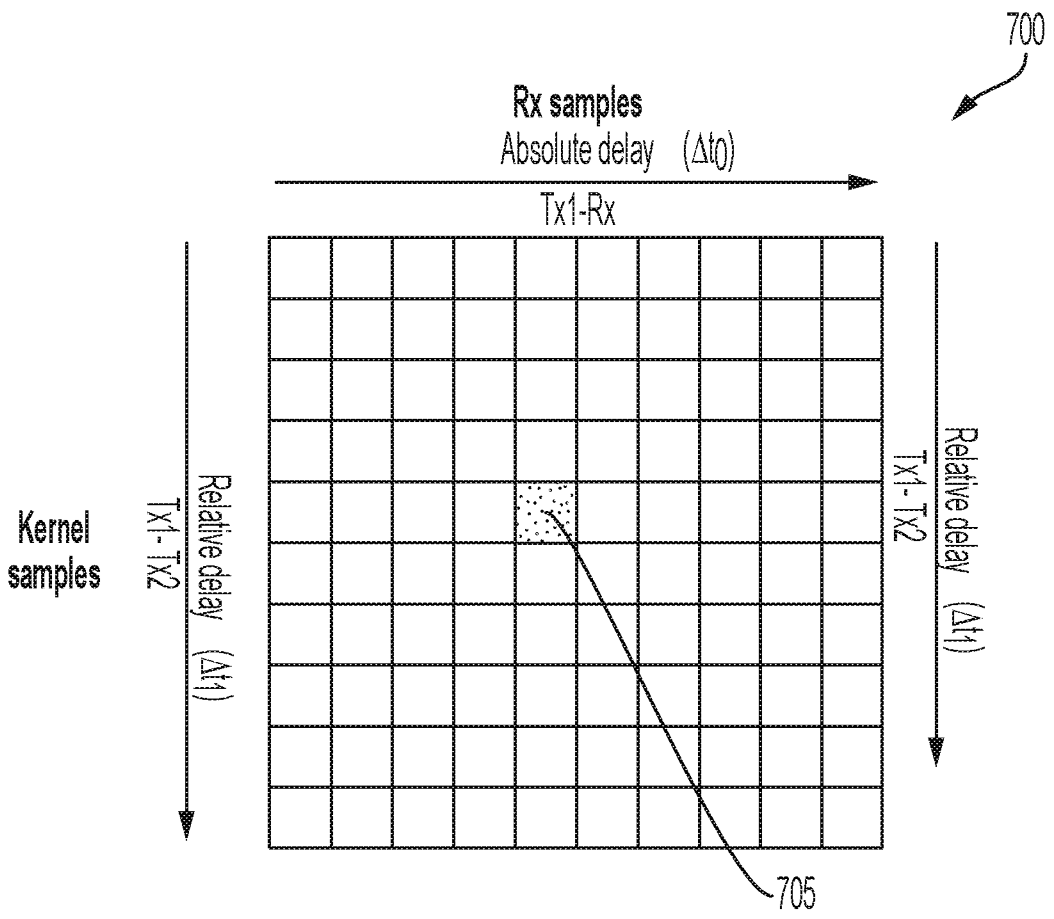
FIG. 7 illustrates a 2D structure for storing correlation values calculated for each of a plurality of first and second delay offset pair candidates according to one or more embodiments of the present disclosure.

FIG. 7 illustrates a 2D structure for storing correlation values calculated for each of a plurality of first and second delay offset pair candidates according to one or more embodiments of the present disclosure.

Referring to FIG. 7, according to one or more embodiments of the present disclosure, when the correlation values (e.g., the first correlation values according to Equation (6) above, or the second correlation values according to Equations (8) and (9) above) are calculated for each of the plurality of first and second delay offset pair candidates, the correlation values may be stored in a 2D structure 700, for example, such as a look-up table. For example, the 2D structure 700 may include a plurality of first offset (e.g., absolute delay offset) candidates across a horizontal axis corresponding to the first delay (e.g., the absolute delay) $\Delta t_0$ between the reference transmitter from among the first and second transmitters 120 and 125 and the receiver 115. The 2D structure 700 may further include a plurality of second offset (e.g., relative delay offset) candidates across a vertical axis corresponding to the second delay (e.g., the relative delay) $\Delta t_1$ between the first and second transmitters 120 and 125.

For each first and second delay offset pair candidate (e.g., for each pair of $\Delta t_0$ along the horizontal axis and $\Delta t_1$ along the vertical axis of the 2D structure 700), a corresponding correlation value calculated based on the interference function x(t) of the selected kernel 204 may be stored therein. For example, the corresponding correlation value may be calculated based on a direct correlation such as in Equation (6) above, assuming the direct product interference function x(t) for IMD2 shown in FIG. 3. On the other hand, the corresponding correlation value may be calculated based on a product correlation value such as in Equations (8) and (9) above, assuming the interference function x(t) for IMD3 shown in FIG. 3.

Once the correlation values have been calculated for each of the first and second delay offset pair candidates according to their corresponding first and second time delays $\Delta t_0$ and $\Delta t_1$, the subset of taps may be selected from among those first and second delay offset pair candidates having the maximum or peak correlation values. For example, FIG. 7 shows one first and second delay offset pair candidate 705 that is identified as having the maximum or peak correlation value from among those of the plurality of first and second delay offset pair candidates. In this case, the tap indices (e.g., i and j for IMD2 and i, j, and k for IMD3) corresponding to at least the one first and second delay offset pair candidate 705 having the maximum or peak correlation value may be determined and used to select the corresponding terms (e.g., $x_1[t-\Delta t_0+i]x_2[t-\Delta t_0-\Delta t_1+j]$) of the selected kernel 204 (e.g., the corresponding interference function x(t)), so that the corresponding channel coefficients (e.g., $c_{i,j}$ for IMD2 and $c_{i,j,k}$ for IMD3) may be estimated, for example, using an RLS algorithm or method, to estimate the transmitted interfering signal y[t].

Figure 8:
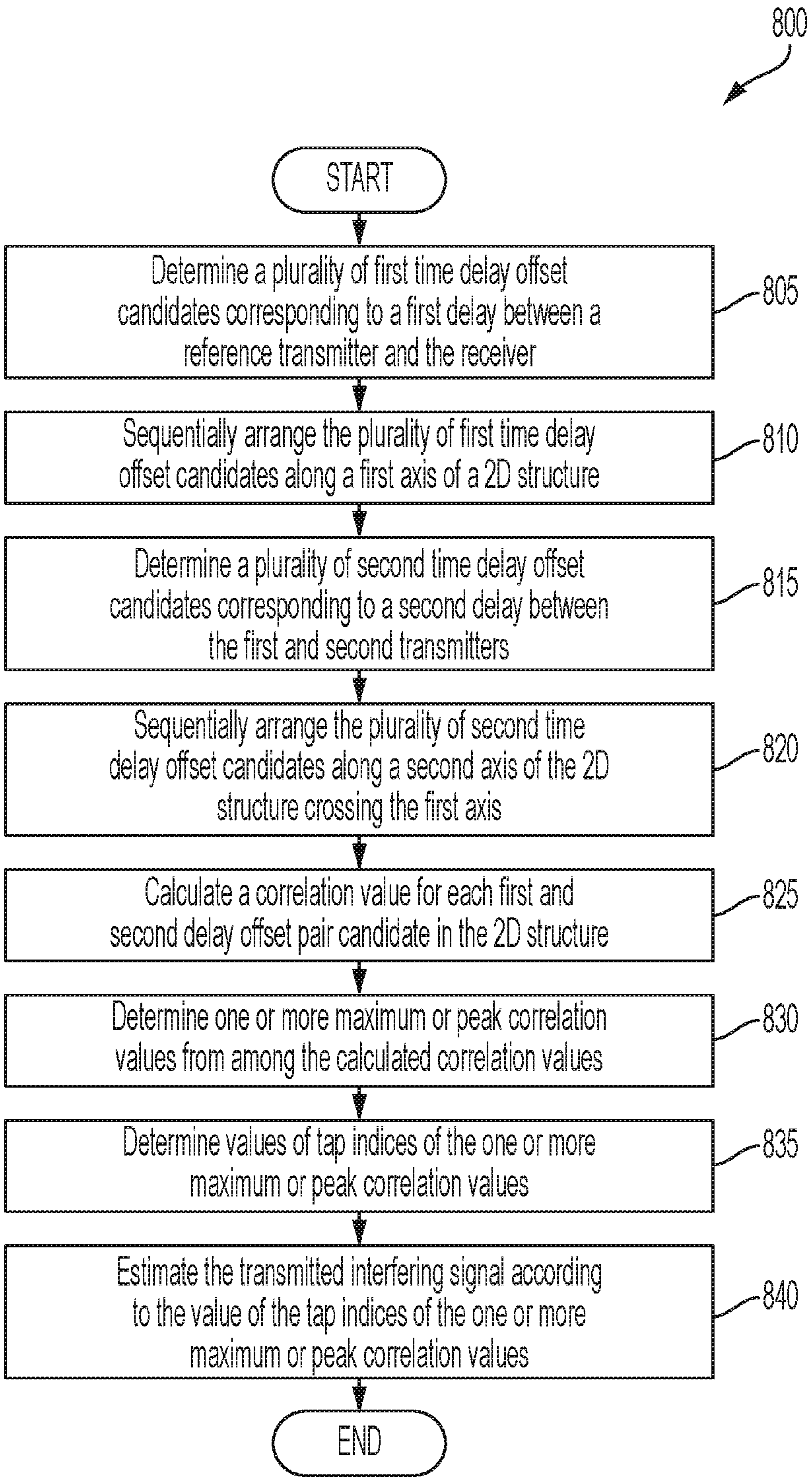
FIG. 8 is a flowchart of a method of selecting a subset of taps for estimating an interference signal according to an embodiment of the present disclosure.

FIG. 8 is a flowchart of a method of selecting a subset of taps for estimating an interference signal according to an embodiment of the present disclosure.

Referring to FIG. 8, the method 800 may start, and a plurality of first time delay offset candidates corresponding to a first delay (e.g., an absolute delay) between a reference transmitter from among the first and second transmitters 120 and 125 and the receiver 115 may be determined at block 805. The plurality of first time delay offset candidates may be sequentially arranged along a first axis of a 2D structure at block 810. For example, as shown in FIG. 7 above, the plurality of first time delay offset candidates $\Delta t_0$ may be arranged along a horizontal axis of the 2D structure 700 in time sequential order.

A plurality of second time delay offset candidates corresponding to a second delay (e.g., a relative delay) between the first and second transmitters 120 and 125 may be determined at block 815. The plurality of second time delay offset candidates may be sequentially arranged along a second axis of the 2D structure crossing the first axis at block 820. For example, as shown in FIG. 7 above, the plurality of second time delay offset candidates $\Delta t_1$ may be arranged along a vertical axis of the 2D structure 700 in time sequential order.

A correlation value may be calculated for each first and second delay offset pair candidate in the 2D structure at block 825. For example, for each pair of a first delay candidate along the first axis and a second delay candidate along the second axis of the 2D structure, a corresponding correlation value may be calculated based on a first correlation (e.g., a direct correlation), for example, according to Equation (6) above, or based on a second correlation (e.g., a product correlation), for example, according to Equations (8) and/or (9) above.

One or more maximum or peak correlation values may be determined from among the calculated correlation values at block 830. For example, in some embodiments, after all of the correlation values have been calculated and stored in the 2D structure 700, the resulting 2D structure 700 may be searched to identify one or more first and second delay offset pair candidates having the largest (in terms of magnitude) correlation value(s).

Values of tap indices (e.g., i and j for IMD2 and i, j, and k for IMD3) of the one or more maximum peak correlation values may be determined at block 835. For example, the values of the tap indices may be determined based on the calculated one or more maximum peak correlation values and according to Equation (5) above (e.g., for IMD2 interference), or according to Equation (7) above (e.g., for IMD3 interference).

The values of the tap indices of the one or more maximum peak correlation values may be used to estimate the transmitted interfering signal y[t] at block 840, and the method 800 may end. For example, the values of the tap indices may be used to select the corresponding terms of the selected kernel 204 (e.g., the corresponding terms of the corresponding interference function x(t)), so that the corresponding channel coefficients (e.g., $c_{i,j}$ for IMD2 and $c_{i,j,k}$ for IMD3) may be estimated, for example, using an RLS algorithm or method, to estimate the transmitted interfering signal y[t] according to the corresponding interference function x(t) of the selected kernel 204 (e.g., such as based on Equation (4) above for IMD2 interference).

According to some embodiments, the subset of taps (e.g., the tap indices) may be selected according to a dynamic approach based on the calculated correlation values stored in the 2D structure 700. For example, in some embodiments, in the dynamic approach, the 2D structure 700 may be searched to identify n number of correlation values (where n is a natural number) having the strongest (e.g., largest) values from among all of the correlation values, and their corresponding tap indices (e.g., i and j for IMD2 and i, j, and k for IMD3) may be selected and used to select the corresponding kernel terms (e.g., $x_1[t-\Delta t_0+i]x_2[t-\Delta t_0-\Delta t_1+j]$ for IMD2) for the transmitted interfering signal y[t] estimation (e.g., based on Equation (4) above for IMD2 interference). In other words, the corresponding channel coefficients (e.g., $c_{i,j}$ for IMD2 and $c_{i,j,k}$ for IMD3) of the transmitted interfering signal y[t] may be estimated based on the selected tap indices and the selected kernel terms, for example, using an RLS algorithm or the like. In an embodiment, n may be equal to 5, such that the 5 strongest (e.g., largest) correlation values may be determined from those stored in the 2D structure 700, and used for the transmitted interfering signal y[t] estimation. However, the present disclosure is not limited thereto, and the value of n may be variously modified as needed or desired, for example, based on a desired performance benchmark and the like for the self-interference cancelation.

According to some embodiments, instead of determining the n number of strongest (e.g., largest) correlation values from among all of the correlation values stored in the 2D structure 700, the subset of taps (e.g., tap indices) may be selected according to a pattern based approach. In this case, when a pattern is selected, all of the terms corresponding to a pre-defined set of terms of the pattern may be selected as a group. For example, as described in more detail below with reference to FIGS. 9 through 12, in the pattern based approach, the first and second delay offset pair candidate having the peak (e.g., the strongest or largest) correlation value may be identified from searching the 2D structure 700, and one or more patterns defining a group of taps rather than individual taps may be used based on a location of the peak correlation value in the 2D structure to select the group of taps defined by the corresponding pattern. In this case, when a pattern is selected, the tap indices corresponding to all of the taps defined by the pattern and their corresponding kernel terms may be selected as a group, rather than just those corresponding to the peak correlation value.

Figure 9:
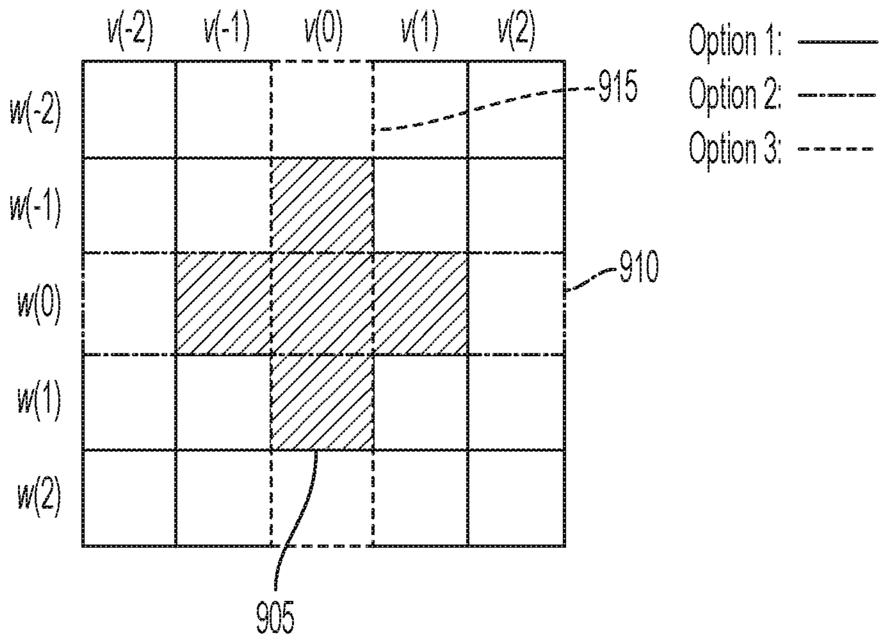
FIG. 9 illustrates a plurality of pattern option candidates for selecting the subset of taps according to an embodiment of the present disclosure.
Figure 10A:
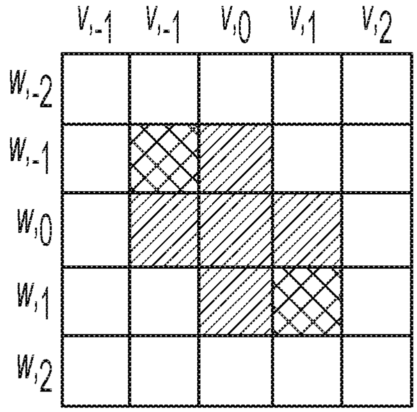
FIGS. 10A and 10B illustrate pattern option candidates including cross-terms and diagonal terms according to one or more embodiments of the present disclosure.
Figure 10B:
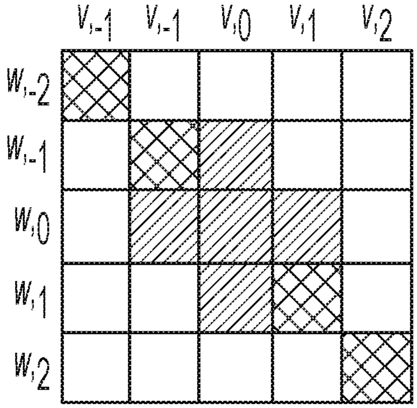
Figure 11A:
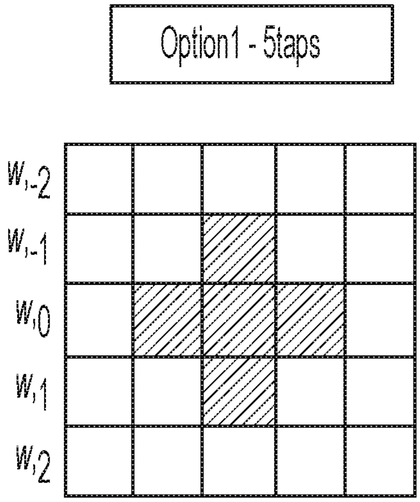
FIGS. 11A and 11B illustrate a method for determining a number of taps to be included in a pattern option candidate according to one or more embodiments of the present disclosure.
Figure 11B:
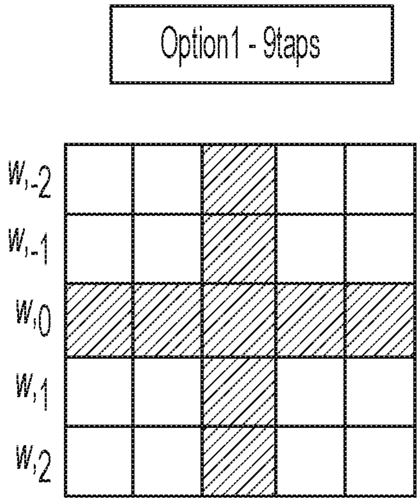

FIG. 9 illustrates a plurality of pattern option candidates for selecting the subset of taps according to an embodiment of the present disclosure. FIGS. 10A and 10B illustrate pattern option candidates including cross-terms and diagonal terms according to one or more embodiments of the present disclosure. FIGS. 11A and 11B illustrate a method for determining a number of taps to be included in a pattern option candidate according to one or more embodiments of the present disclosure.

Referring to FIG. 9, a set of three pattern option candidates are illustrated, and each of the pattern option candidates may be defined as a group of taps. For example, in FIG. 9, a first option (Option 1) 905 (e.g., illustrated with solid lines), a second option (Option 2) 910 (e.g., illustrated with dot-dash lines), and a third option (Option 3) 915 (e.g., illustrated with dashed lines) are shown, each representing a pattern option candidate including a group of 5 taps. While 5 taps are shown for each pattern option candidate in the example illustrated in FIG. 9, the present disclosure is not limited thereto, and the number of taps in each pattern option candidate may be variously modified as needed or desired, for example, based on a desired performance benchmark and the like for the self-interference cancelation.

As a representative example, the first option (Option 1) 905 illustrated in FIG. 9 may correspond to a pattern of a subset of taps from M=3 and N=3 (e.g., $\{x_1[0]x_2[0]; x_1[0]x_2[1]; x_1[0]x_2[1]; x_1[-1]x_2[0]; x_1[1]x_2[0]\}$), where M and N correspond to the length of the FIR filters w and v, respectively. The second option (Option 2) 910 illustrated in FIG. 9 may correspond to a pattern of a subset of taps from M=5 and N=1 (e.g., $x_2[0]\times\{x_1[-2]; x_1[-1]; x_1[0]; x_1[1]; x_1[2]\}$), where M and N correspond to the length of the FIR filters w and v, respectively. The third option (Option 3) 915 illustrated in FIG. 9 may correspond to a pattern of a subset of taps from M=1 and N=5 (e.g., $x_1[0]\times\{x_2[-2]; x_2[-1]; x_2[0]; x_2[1]; x_2[2]\}$), where M and N correspond to the length of the FIR filters w and v, respectively. The examples of the pattern option candidates illustrated in FIG. 9 are based on scenarios in which the contribution of one transmitter relative to the other transmitter in terms of the self-interference induced to the received signal may either be roughly the same as each other (e.g., Option 1), may be dominant from the first transmitter 120 (e.g., Option 2), or may be dominant from the second transmitter 125 (e.g., Option 3).

However, the present disclosure is not limited to the pattern option candidates illustrated in FIG. 9. Each pattern option candidate may have any suitable shape, may have any suitable number of taps, and/or may be extended to any suitable kind of scenario. Further, the number of pattern option candidates is not limited to the three illustrated in FIG. 9, and the set of pattern option candidates may have any suitable number of different pattern option candidates as needed or desired.

According to the pattern based approach, once the first and second delay offset pair candidate having the peak (e.g., the strongest or largest) correlation value is identified from the 2D structure 700, each of the pattern option candidates Option 1, Option 2, and Option 3 may be arranged with the peak correlation value at the center (e.g., w(0), v(0)) of each of the pattern option candidates Option 1, Option 2, and Option 3. FIG. 9 shows a condensed version of the table of FIG. 7 with only a few values (e.g., correlation values) illustrated around the peak correlation value 705 for a 5 tap pattern structure for convenience of illustration and explanation. A sum of the correlation values (e.g., $\mathrm{Corr}(\Delta t_0+i, \Delta t_1+j)$ of the group of taps in a corresponding pattern may be calculated for each of the pattern option candidates, with the tap indices (e.g., i and j for IMD2 and i, j, and k for IMD3) corresponding to the tap indices of the group of taps in the corresponding pattern for each pattern option candidate.

For example, the sum of correlation values of the first option (Option 1) may be calculated based on Equation (10) below.

$$\mathrm{sum1} = \sum_{i,j\in Option1} \mathrm{Corr}(\Delta t_0 + i, \Delta t_1 + j) \quad \text{Equation (10)}$$

For example, the sum of correlation values of the second option (Option 2) may be calculated based on Equation (11) below.

$$sum2 = \sum_{i,j \in Option2} \mathrm{Corr}(\Delta t_0 + i, \Delta t_1 + j) \quad \text{Equation (11)}$$

For example, the sum of correlation values of the third option (Option 3) may be calculated based on Equation (12) below.

$$sum3 = \sum_{i,j \in Option3} \mathrm{Corr}(\Delta t_0 + i, \Delta t_1 + j) \quad \text{Equation (12)}$$

The sum of correlation values of each of the pattern option candidates may be ranked (e.g., according to magnitude), and the group of terms for the highest ranked (e.g., the strongest or largest) sum of correlation values may be selected and used for estimating the corresponding channel coefficients (e.g., $c_{i,j}$ for IMD2 and $c_{i,j,k}$ for IMD3) of the transmitted interfering signal y[t], for example, using an RLS algorithm or the like.

FIG. 9 illustrates three different options corresponding to the selection of cross-terms (e.g., i≠j) only for the tap indices, such that the values of i and j (e.g., the combination of the w and v terms) are always different from each other. However, the present disclosure is not limited thereto. For example, in some embodiments, in addition to the cross-terms for the tap indices, one or more of the pattern option candidates may also include diagonal terms (e.g., i=j) for the tap indices.

Referring to FIGS. 10A and 10B, assuming the cross-terms corresponding to Option 1 in FIG. 9, the diagonal terms correspond to $\{w_{,-1}, v_{,-1}\}$ and $\{w_{,1}, v_{,1}\}$ (e.g., cross-terms Option 1 with 7 taps) as shown in FIG. 10A, or further, the diagonal terms corresponding to $\{w_{,-2}, v_{,-2}\}$ and $\{w_{,2}, v_{,2}\}$ (e.g., cross-terms Option 1 with 9 taps) as shown in FIG. 10B, may be desired to improve the estimation of the transmitted interfering signal y[t]. The exact pattern of each pattern option candidate may be predefined, or may be dynamically formed.

Referring to FIGS. 11A and 11B, in some embodiments, the number of taps to be included in each of the pattern option candidates may be adjusted as needed or desired, for example, based on a determination of whether or not increasing the number of taps for a particular pattern option candidate would lead to improved performance. For example, assuming Option 1 in FIG. 9, 5 taps may be considered as shown in FIG. 11A or 9 taps may be considered as shown in FIG. 11B. In this case, the number of taps to be included in a corresponding pattern option candidate may be determined by comparing a ratio of the sum of correlation values for Option 1 with the 5 taps illustrated in FIG. 11A by the sum of correlation values for Option 1 with the 9 taps illustrated in FIG. 11B against a threshold (e.g., a predetermined threshold), for example, based on Equation (13) below.

$$\frac{tot_{corr}(\text{Option1 5taps})}{tot_{corr}(\text{Option1 9taps})} \leq \text{threshold} \quad \text{Equation (13)}$$

In Equation (13), a total correlation value $tot_{Corr}$, which is the sum of the cross-correlation between the kernels from the selected pattern option candidate and the received samples, for IMD3 may be defined by Equation (14) below.

$$tot_{corr}(\text{cross-terms}) = \sum_{i,j \in Cross-terms\ Set} \mathrm{Corr}(\Delta t_0 + i, \Delta t_1 + j) = \sum_{i,j \in Cross-terms\ Set} E\{y[t](x_1[t - \Delta t_0 + i]x_2^2[t - \Delta t_0 - \Delta t_1 + j])^*\} \quad \text{Equation (14)}$$

Figure 12:
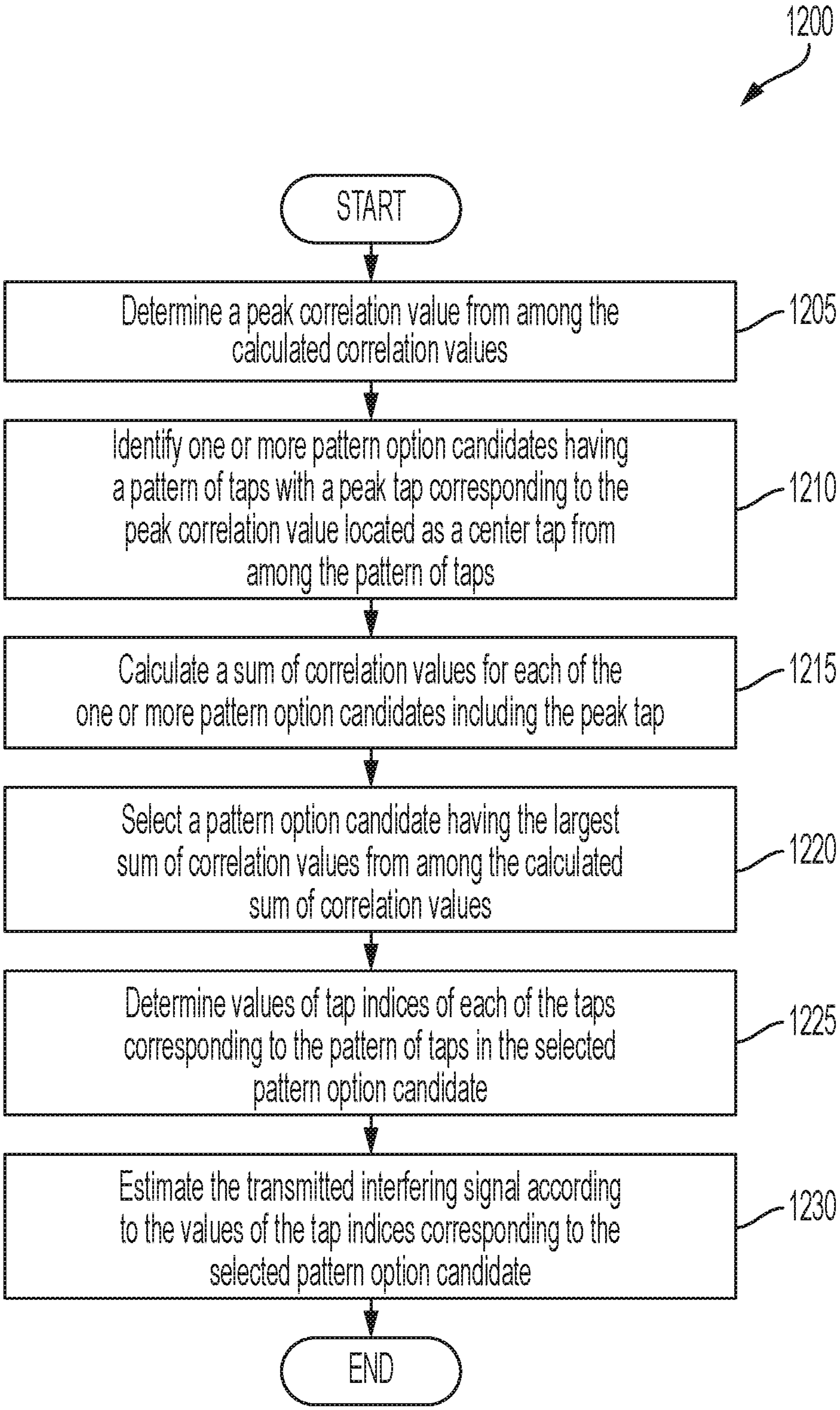
FIG. 12 illustrates a flowchart of a method of selecting a subset of taps for estimating an interference signal according an embodiment of the present disclosure.

FIG. 12 illustrates a flowchart of a method of selecting a subset of taps for estimating an interference signal according to an embodiment of the present disclosure. For example, FIG. 12 illustrates a method of selecting the subset of taps according to a plurality of pattern option candidates.

Referring to FIG. 12, the method 1200 may start, and a peak (e.g., maximum) correlation value may be determined from the calculated correlation values at block 1205. For example, the peak correlation value may be determined by searching the 2D structure 700 (e.g., see FIG. 7) that stores the calculated correlation values according to their first time delay (e.g., the absolute delay) and their second time delay (e.g., the relative delay). Each of the correlation values may be calculated based on a first correlation (e.g., a direct correlation), for example, according to Equation (6) above, or based on a second correlation (e.g., a product correlation), for example, according to Equations (8) and/or (9) above, and stored in the 2D structure 700 according to their corresponding first and second offset delays $\Delta t_0$ and $\Delta t_1$.

One or more pattern option candidates having a pattern of taps with a peak tap corresponding to the peak correlation value located as a center tap from among the pattern of taps may be identified at block 1210, and a sum of correlation values may be calculated for each of the one or more pattern option candidates including the peak tap at block 1215. For example, each of the one or more pattern option candidates may be arranged with the peak correlation value at the center (e.g., w(0), v(0)) of each of the one or more pattern option candidates. The sum of the correlation values (e.g., Corr ($\Delta t_0$+i, $\Delta t_1$+j)) of the group of taps in a corresponding pattern may be calculated for each of the pattern option candidates, with the tap indices (e.g., i and j for IMD2 and i, j, and k for IMD3) corresponding to the tap indices of the group of taps in the corresponding pattern for each pattern option candidate.

A pattern option candidate having the largest sum of correlation values from among the calculated sum of correlation values may be selected at block 1220, and values of the tap indices of each of the taps corresponding to the pattern of taps of the selected pattern option candidate may be determined at block 1225. For example, the tap indices corresponding to all of the taps defined by the pattern of the selected pattern option candidate and their corresponding kernel terms may be selected as a group, rather than just those corresponding to the peak correlation value.

The transmitted interfering signal may be estimated according to the values of the tap indices corresponding to the selected pattern option candidate at block 1230, and the method 1200 may end. For example, the values of the tap indices of the corresponding pattern of taps may be used to select the corresponding terms of the selected kernel 204 (e.g., the corresponding terms of the corresponding interference function x(t)), so that the corresponding channel coefficients (e.g., $c_{i,j}$ for IMD2 and $c_{i,j,k}$ for IMD3) may be estimated, for example, using an RLS algorithm or method, to estimate the transmitted interfering signal y[t] according to the corresponding interference function x(t) of the selected kernel 204 (e.g., such as based on Equation (4) above for IMD2 interference).

Figure 13:
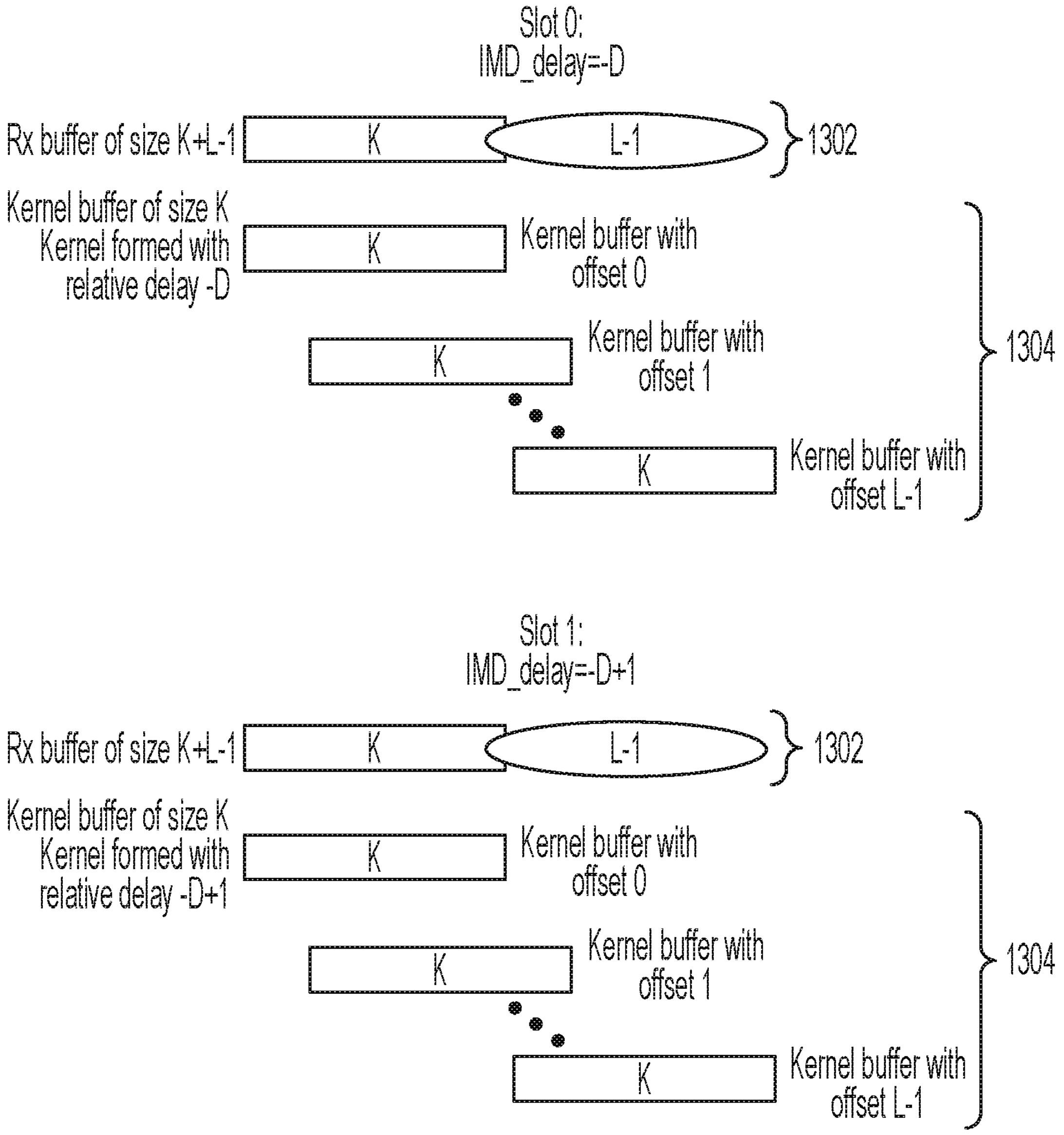
FIG. 13 illustrates a method of calculating correlation values according to an embodiment of the present disclosure.
Figure 14:
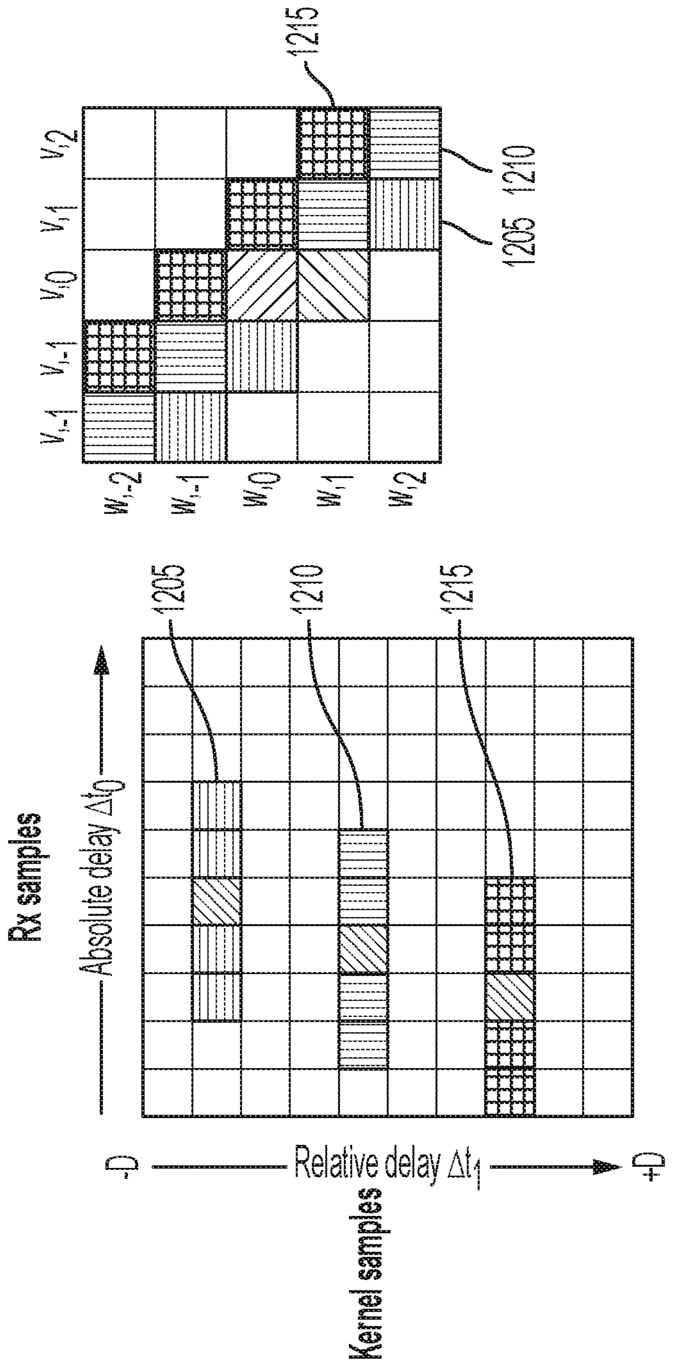
FIG. 14 illustrates a 2D structure for storing the correlation values calculated according to the method of FIG. 13.

FIG. 13 illustrates a method of calculating correlation values according to an embodiment of the present disclosure. FIG. 14 illustrates a 2D structure for storing the correlation values calculated according to the method of FIG. 13.

In some embodiments, the direct calculation of the sum of correlation values over different taps to select the pattern option candidate (e.g., based on the method 1200 described above), or to select the individual terms (e.g., based on the dynamic approach described above) may not be feasible due to hardware limitations (e.g., storage or memory limitations). Moreover, in actual operation, most of such calculations may be performed in real or near-real time (e.g., on-the-fly). According to one or more embodiments of the present disclosure, rather than storing all of the calculated correlation values in the 2D structure 700 described above with reference to FIG. 7, a smaller 2D structure matrix may be generated with low hardware complexity, and the smaller 2D structure matrix may be used to select the one or more strongest terms (e.g., the one or more strongest correlation values) or a group of the strongest terms of a pattern of taps (e.g., in a pattern option candidate).

Referring to FIGS. 13, in some embodiments, a set of the first delay candidates (e.g., a set of the absolute delay candidates) may be stored in a first buffer (e.g., an RX buffer) 1302, and the second delay candidates (e.g., the relative delay candidates) may be stored in a second buffer (e.g., a kernel buffer) 1304 one at a time for each time instance (e.g., for each Slot). For example, the first buffer may have a size of K+L−1, and the second buffer may have a size of K.

At each time instance (e.g., at each Slot), the correlation values may be calculated for each of the first delay candidates stored in the first buffer 1302 based on a given one of the second delay candidates stored in the second buffer 1304 to identify a peak correlation value for each time instance. In this case, after the peak correlation value is determined for a corresponding time instance (e.g., for a corresponding Slot) based on a given one of the second delay candidates stored in the second buffer 1304, the second delay candidate stored in the second buffer 1304 may be incremented for a next time instance (e.g., a next Slot), so that the correlation values for each of the first delay candidates stored in the first buffer 1302 may be subsequently calculated based on the incremented one of the second delay candidates stored in the second buffer 1304 to identify a peak correlation value for the next time instance.

This process may repeat over subsequent time instances (e.g., over subsequent Slots), until each of the relative delay candidates have been incremented in the second buffer 1304 to identify the peak correlation value for each of the time instances (e.g., for each of the Slots). The peak correlation value identified for each of the time instances may be compared with a peak correlation value identified for a previous time instance, and the smaller 2D structure matrix (e.g., see table on right of FIG. 14) may be generated based on the comparison.

In more detail, as shown in FIG. 13, at a first time instance (e.g., Slot=0), the correlation values may be calculated corresponding to a set of absolute delay candidate values (e.g., L values) in the first buffer 1302 and a given one of the second delay candidates (e.g., −D) in the second buffer 1304 for the first time instance (e.g., at Slot=0). The correlation values may be calculated, for example, based on a first correlation (e.g., a direct correlation), for example, according to Equation (6) above, or based on a second correlation (e.g., a product correlation), for example, according to Equations (8) and/or (9) above. A peak correlation value peak(−D) for the first time instance (e.g., at Slot=0) may be determined, and the peak correlation value peak(−D) may be stored, along with a configurable number of values around the peak correlation value peak(−D). This is illustratively shown in the table on the left of FIG. 14, with the peak value indicated in the middle and the configurable number of values around the peak value indicated along the horizontal direction illustrated in the table on the left of FIG. 14. This corresponds to filling one diagonal in the table on the right of FIG. 14, which corresponds to the smaller 2D structure that is a condensed version of the table on the left of FIG. 14. In other words, in FIG. 14, the table on the left is illustrated for convenience of comprehension based on the buffer based peak correlation value search described above, but may not be actually generated during the on-the-fly approach. Instead, the smaller 2D structure on the right of FIG. 14 corresponding to a 5×5 (or other configurable number) structure of group correlation values is generated.

While FIG. 14 illustrates 5 values (e.g., 5 taps) including the peak correlation value peak(−D) at the center of the 5 values, the present disclosure is not limited thereto, and the number of taps may be variously modified as needed or desired, for example, based on a desired performance benchmark and the like for the self-interference cancelation. For example, the configurable number of values around the peak correlation value may be determined based on the channel response length, or can be experimentally determined based on a desired design.

At a second time instance (e.g., Slot=1), the correlation values may be calculated corresponding to the set of absolute delay candidate values (e.g., the L values) in the first buffer 1302 and a next one of the second delay candidates (e.g., −D+1) in the second buffer 1304 for the second time instance (e.g., at Slot=1). The correlation values may be calculated, for example, based on a first correlation (e.g., a direct correlation), for example, according to Equation (6) above, or based on a second correlation (e.g., a product correlation), for example, according to Equations (8) and/or (9) above.

A peak correlation value peak(−D+1) for the second time instance (e.g., at Slot=1) may be determined, and the peak correlation value peak(−D+1) may be compared with a peak correlation value (e.g., peak(−D)) stored for a previous time instance against a threshold (e.g., peak(−D+1)−peak(−D)>threshold). For example, if a difference between the subsequent peak correlation value (e.g., peak(−D+1)) and the stored peak correlation value (e.g., peak(−D)) is greater than the threshold, the table (e.g., the table on the right of FIG. 14) may be reset, and filled with the subsequent peak correlation value peak(−D+1), along with a configurable number of values around the peak correlation value peak(−D+1) (e.g., shown in the horizontal direction as indicated by 1205 in the table on the left of FIG. 14, which corresponds to filling one diagonal in the generated smaller 2D structure on the right of FIG. 14. On the other hand, if the difference between the subsequent peak correlation value (e.g., peak(−D+1)) and the stored peak correlation value (e.g., peak(−D)) is less than the threshold (e.g., peak(−D+1)−peak(−D) <threshold), the subsequent peak correlation value (e.g., peak(−D+1)) and the configurable number of values around the subsequent peak correlation value (e.g., peak(−D+1)) may be appended to the table, which may correspond to filling another diagonal in the generated 2D structure matrix on the right of FIG. 14 (e.g., see 1215 with respect to 1210 in the table on the right of FIG. 14).

The process may be repeated over subsequent time instances (e.g., over subsequent Slots), until each of the relative delay candidates have been incremented in the second buffer 1304 and considered for the peak correlation value determination, so that the 2D structure matrix on the right of FIG. 14 corresponding to X×X strongest tap candidates may be generated to select the subset of taps therefrom using any of the methods (e.g., the dynamic approach or the pattern based approach) described above.

Figure 15:
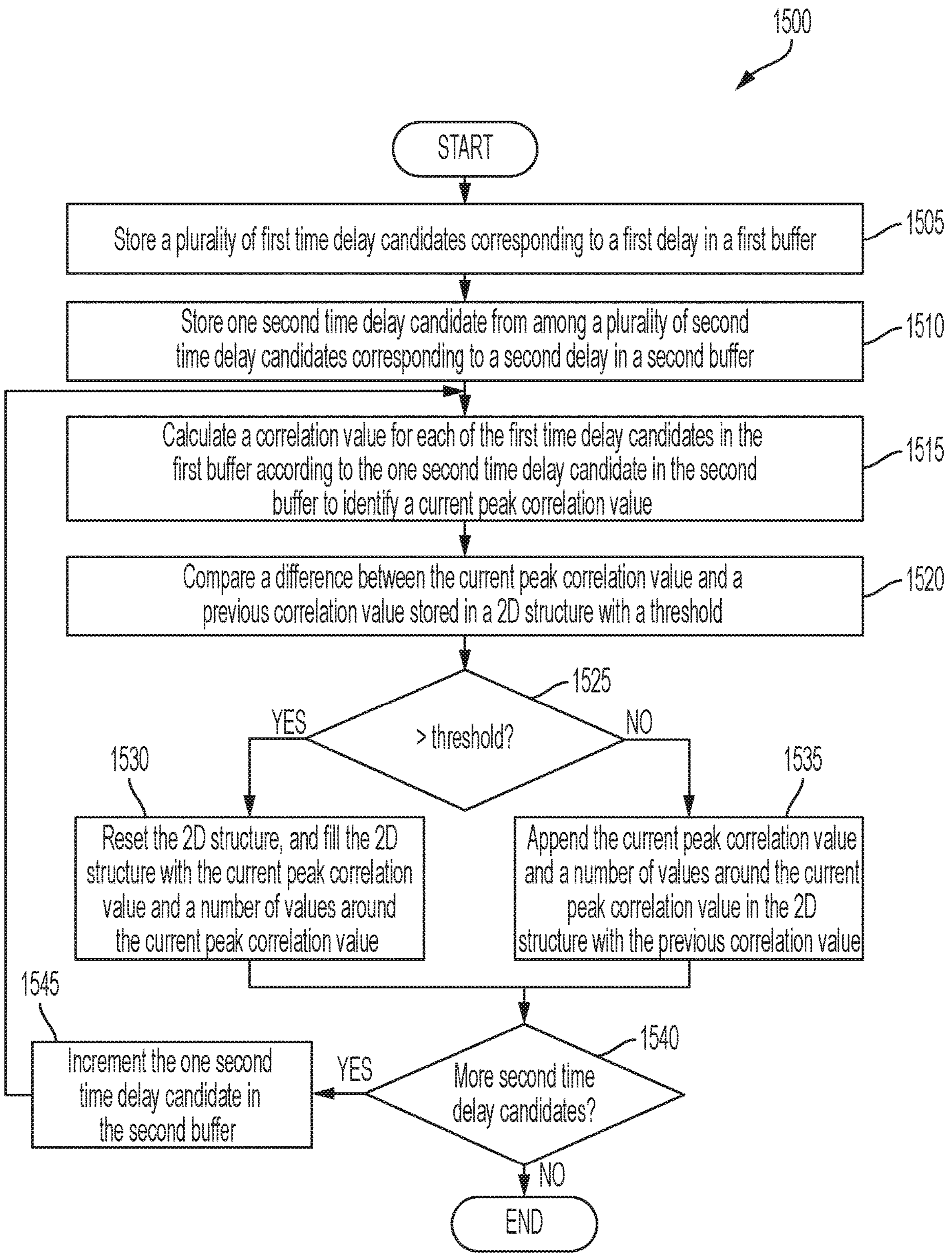
FIG. 15 illustrates a flowchart of a method of calculating correlation values according to an embodiment of the present disclosure.

FIG. 15 illustrates a flowchart of a method of calculating correlation values according to an embodiment of the present disclosure.

Referring to FIG. 15, the method 1500 may start, and a plurality of first time delay candidates corresponding to a first delay may be stored in a first buffer at block 1505. The plurality of first time delay candidates may each correspond to a first delay offset (e.g., an absolute delay offset) between a reference transmitter from among the first and second transmitters 120 and 125 and the receiver 115. One second time delay candidate from among a plurality of second time delay candidates corresponding to a second delay may be stored in a second buffer at block 1510, for example, for a first time instance. The one second time delay candidate may correspond to one second offset (e.g., one relative offset) candidate from among a plurality of second time delay offset candidates corresponding to a second delay between the first and second transmitters 120 and 125.

A correlation value may be calculated for each of the first time delay candidates in the first buffer according to the one second time delay candidate in the second buffer to identify a current peak correlation value at block 1515, for example, for the first time instance. The correlation value may be calculated based on a first correlation (e.g., a direct correlation), for example, according to Equation (6) above, or based on a second correlation (e.g., a product correlation), for example, according to Equations (8) and/or (9) above. The current peak correlation value may be the maximum or peak correlation value (e.g., the largest correlation value in terms of magnitude) of the first time instance from among the correlation values calculated for the first time instance.

A difference between the current peak correlation value and a previous correlation value stored in a 2D structure may be compared with a threshold at block 1520. Block 1520 assumes that the first time instance is subsequent to an initial time instance, and the peak correlation value calculated for the initial time instance is already stored in the 2D structure. However, if the first time instance is the initial time instance, then the current peak correlation value may not be compared with the threshold, and instead, may be added to the 2D structure along with a number of values around the current peak correlation value. As another example, if the first time instance is the initial time instance, then the current peak correlation value compared with the threshold may be larger than the threshold (e.g., YES at block 1525), or may be smaller than the threshold (e.g., NO at block 1525).

If the difference is greater than (e.g., greater than or equal to) the threshold at block 1525 (e.g., YES at block 1525), the 2D structure may be reset, and filled with the current peak correlation value and a number of values around the current peak correlation value at block 1530. If the difference is less than the threshold at block 1525 (e.g., NO at block 1525), the current peak correlation value and a number of values around the current peak correlation value may be appended to the 2D structure including the previous correlation value at block 1535.

In either case, after the 2D structure has been updated at block 1530 or at block 1535, a determination may be made if there are more second time delay candidates to consider at block 1540. If so (e.g., YES at block 1540), the one second time delay candidate in the second buffer may be incremented for a next time instance, and the method 1500 may repeat at block 1515 to calculate a correlation value for the next time instance. In other words, a correlation value may be calculated for each of the first time delay candidates in the first buffer according to the incremented one second time delay candidate in the second buffer to identify a current peak correlation value for the next time instance.

On the other hand, if there are no more second time delay candidates to consider at block 1530 (e.g., NO at block 1540), the method 1500 may end. In this case, the resulting 2D structure that is filled according to the method 1500 may be used to select the subset of taps, for example, according to any of the methods (e.g., the dynamic approach or the pattern based approach) described above to estimate the transmitted interfering signal y[t].

Figure 16:
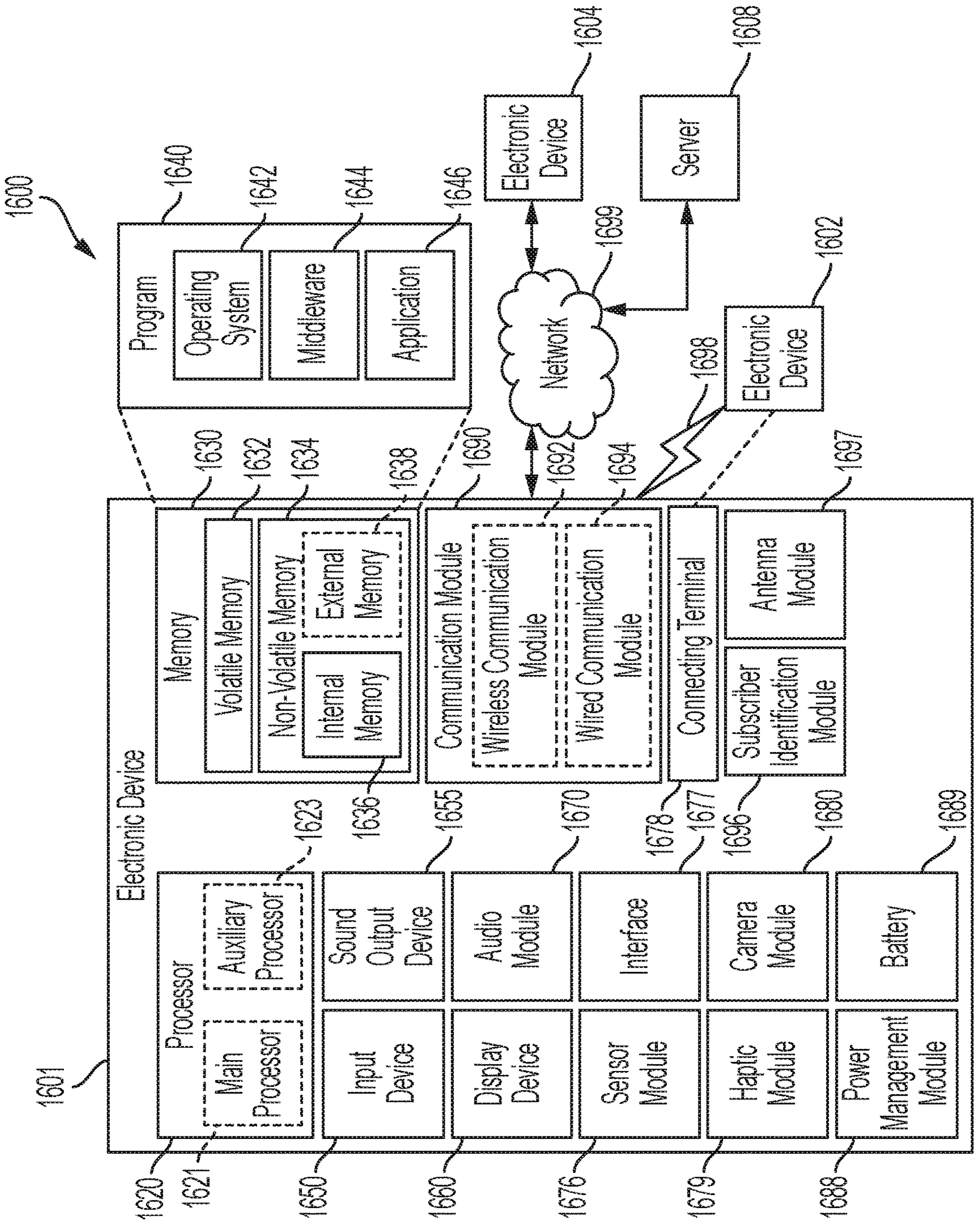
FIG. 16 is a block diagram of an electronic device in a network environment 1600, according to an embodiment of the present disclosure.

FIG. 16 is a block diagram of an electronic device in a network environment 1600, according to an embodiment of the present disclosure. For example, in some embodiments, the system 100 may include, or may be implemented as, the electronic device illustrated in FIG. 16.

Referring to FIG. 16, an electronic device 1601 in a network environment 1600 may communicate with an electronic device 1602 via a first network 1698 (e.g., a short-range wireless communication network), or an electronic device 1604 or a server 1608 via a second network 1699 (e.g., a long-range wireless communication network). The electronic device 1601 may communicate with the electronic device 1604 via the server 1608. The electronic device 1601 may include a processor 1620, a memory 1630, an input device 1650, a sound output device 1655, a display device 1660, an audio module 1670, a sensor module 1676, an interface 1677, a haptic module 1679, a camera module 1680, a power management module 1688, a battery 1689, a communication module 1690, a subscriber identification module (SIM) card 1696, or an antenna module 1697. In one embodiment, at least one (e.g., the display device 1660 or the camera module 1680) of the components may be omitted from the electronic device 1601, or one or more other components may be added to the electronic device 1601. Some of the components may be implemented as a single integrated circuit (IC). For example, the sensor module 1676 (e.g., a fingerprint sensor, an iris sensor, or an illuminance sensor) may be embedded in the display device 1660 (e.g., a display).

The processor 1620 may execute software (e.g., a program 1640) to control at least one other component (e.g., a hardware or a software component) of the electronic device 1601 coupled with the processor 1620 and may perform various data processing or computations.

As at least part of the data processing or computations, the processor 1620 may load a command or data received from another component (e.g., the sensor module 1676 or the communication module 1690) in volatile memory 1632, process the command or the data stored in the volatile memory 1632, and store resulting data in non-volatile memory 1634. The processor 1620 may include a main processor 1621 (e.g., a central processing unit (CPU) or an application processor (AP)), and an auxiliary processor 1623 (e.g., a graphics processing unit (GPU), an image signal processor (ISP), a sensor hub processor, or a communication processor (CP)) that is operable independently from, or in conjunction with, the main processor 1621. Additionally or alternatively, the auxiliary processor 1623 may be adapted to consume less power than the main processor 1621, or execute a particular function. The auxiliary processor 1623 may be implemented as being separate from, or a part of, the main processor 1621.

The auxiliary processor 1623 may control at least some of the functions or states related to at least one component (e.g., the display device 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). The auxiliary processor 1623 (e.g., an image signal processor or a communication processor) may be implemented as part of another component (e.g., the camera module 1680 or the communication module 1690) functionally related to the auxiliary processor 1623.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634. Non-volatile memory 1634 may include internal memory 1636 and/or external memory 1638.

The program 1640 may be stored in the memory 1630 as software, and may include, for example, an operating system (OS) 1642, middleware 1644, or an application 1646.

The input device 1650 may receive a command or data to be used by another component (e.g., the processor 1620) of the electronic device 1601, from the outside (e.g., a user) of the electronic device 1601. The input device 1650 may include, for example, a microphone, a mouse, or a keyboard.

The sound output device 1655 may output sound signals to the outside of the electronic device 1601. The sound output device 1655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1660 may visually provide information to the outside (e.g., a user) of the electronic device 1601. The display device 1660 may include, for example, a display, a hologram device, or a projector and control circuitry to control a corresponding one of the display, hologram device, and projector. The display device 1660 may include touch circuitry adapted to detect a touch, or sensor circuitry (e.g., a pressure sensor) adapted to measure the intensity of force incurred by the touch.

The audio module 1670 may convert a sound into an electrical signal and vice versa. The audio module 1670 may obtain the sound via the input device 1650 or output the sound via the sound output device 1655 or a headphone of an external electronic device 1602 directly (e.g., wired) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. The sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device 1602 directly (e.g., wired) or wirelessly. The interface 1677 may include, for example, a high-definition multimedia interface (HDMI), a universal serial bus (USB) interface, a secure digital (SD) card interface, or an audio interface.

A connecting terminal 1678 may include a connector via which the electronic device 1601 may be physically connected with the external electronic device 1602. The connecting terminal 1678 may include, for example, an HDMI connector, a USB connector, an SD card connector, or an audio connector (e.g., a headphone connector).

The haptic module 1679 may convert an electrical signal into a mechanical stimulus (e.g., a vibration or a movement) or an electrical stimulus which may be recognized by a user via tactile sensation or kinesthetic sensation. The haptic module 1679 may include, for example, a motor, a piezoelectric element, or an electrical stimulator.

The camera module 1680 may capture a still image or moving images. The camera module 1680 may include one or more lenses, image sensors, image signal processors, or flashes. The power management module 1688 may manage power supplied to the electronic device 1601. The power management module 1688 may be implemented as at least part of, for example, a power management integrated circuit (PMIC).

The battery 1689 may supply power to at least one component of the electronic device 1601. The battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the AP) and supports a direct (e.g., wired) communication or a wireless communication. The communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as BLUETOOTH™, wireless-fidelity (Wi-Fi) direct, or a standard of the Infrared Data Association (IrDA)) or the second network 1699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The antenna module 1697 may transmit or receive a signal or power to or from the outside (e.g., the external electronic device) of the electronic device 1601. The antenna module 1697 may include one or more antennas, and, therefrom, at least one antenna appropriate for a communication scheme used in the communication network, such as the first network 1698 or the second network 1699, may be selected, for example, by the communication module 1690 (e.g., the wireless communication module 1692). The signal or the power may then be transmitted or received between the communication module 1690 and the external electronic device via the selected at least one antenna.

Commands or data may be transmitted or received between the electronic device 1601 and the external electronic device 1604 via the server 1608 coupled with the second network 1699. Each of the electronic devices 1602 and 1604 may be a device of a same type as, or a different type, from the electronic device 1601. All or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1601. The electronic device 1601 may provide the outcome, with or without further processing of the outcome, as at least part of a reply to the request. To that end, a cloud computing, distributed computing, or client-server computing technology may be used, for example.

Figure 17:
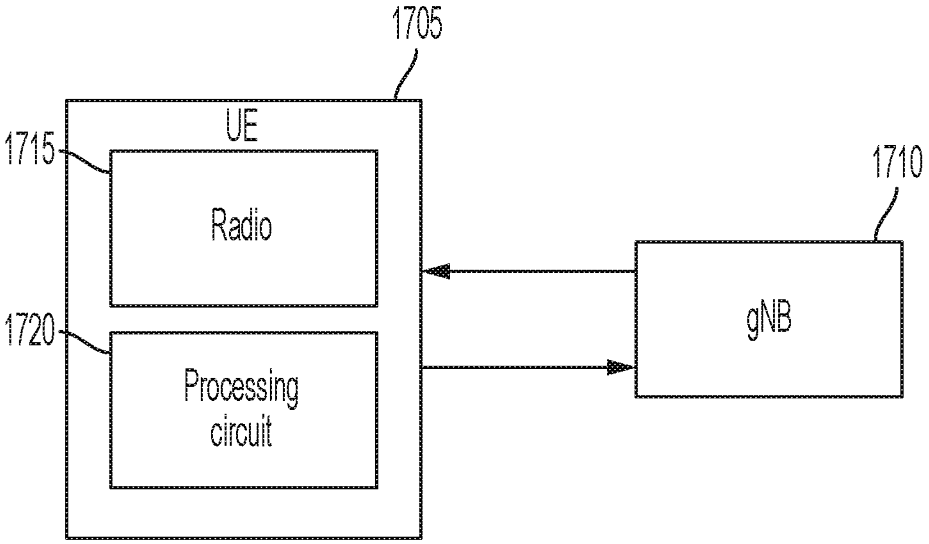
FIG. 17 shows a system including a UE and a gNB in communication with each other.

FIG. 17 shows a system including a UE 1705 and a gNB 1710 in communication with each other. The UE may include a radio 1715 and a processing circuit (or a means for processing) 1720, which may perform various methods disclosed herein, e.g., the methods illustrated in FIGS. 2-15. For example, the processing circuit 1720 may receive, via the radio 1715, transmissions from the network node (gNB) 1710, and the processing circuit 1720 may transmit, via the radio 1715, signals to the gNB 1710.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A system comprising:
a first transmitter configured to transmit a first signal;
a second transmitter configured to transmit a second signal;
a receiver configured to receive a downlink signal, the downlink signal comprising a desired signal and an interference signal corresponding to the first signal and the second signal;
a processor; and
memory comprising instructions that, when executed by the processor, cause the processor to:
select an interference function based on center frequencies of the first transmitter, the second transmitter, and the receiver;
calculate correlation values based on a first delay between the receiver and a reference transmitter from among the first and second transmitters, and a second delay between the first and second transmitters, the first delay and the second delay being used as inputs to calculate the correlation values based on the selected interference function;
select one or more filter taps based on the calculated correlation values;
estimate the interference signal based on the selected one or more filter taps and the interference function;
determine the desired signal from the downlink signal according to the estimated interference signal; and
transmit the desired signal.

2. The system of claim 1, wherein the calculated correlation values are stored in a 2D structure, and the stored correlation values are used by the processor to select the one or more filter taps.

3. The system of claim 2, wherein the 2D structure comprises:
a plurality of first time delay offset candidates for the first delay between the receiver and the reference transmitter along a first axis;
a plurality of second time delay offset candidates for the second delay between the first and second transmitters along a second axis; and
a correlation value from among the calculated correlation values for each pair of the first and second time delay offset candidates.

4. The system of claim 2, wherein to generate the 2D structure, the instructions further cause the processor to:
calculate the correlation values for a plurality of first time delay offset candidates stored in a first buffer based on one second time delay offset candidate stored in a second buffer for a first time instance;
determine a current peak correlation value from among the calculated correlation values for the first time instance;
compare a difference between the current peak correlation value for the first time instance and a previous correlation value stored in the 2D structure for a previous time instance with a threshold; and
store the current peak correlation value in the 2D structure based on the compare.

5. The system of claim 4, wherein:
in response to a determination that the difference is greater than the threshold, the 2D structure is reset, and at least the current peak correlation value is stored in the 2D structure; and
in response to a determination that the difference is less than the threshold, the current peak correlation value is added to the 2D structure including at least the previous correlation value.

6. The system of claim 2, wherein to select the one or more filter taps, the instructions further cause the processor to:
identify n number of strongest correlation values from the 2D structure, where n is a natural number;
determine tap indices of the n number of strongest correlation values;
select terms for the interference function based on the tap indices;
estimate channel coefficients based on the tap indices and the selected terms; and
estimate the interference signal based on the estimated channel coefficients.

7. The system of claim 2, wherein to select the one or more filter taps, the instructions further cause the processor to:
identify a peak correlation value from the 2D structure;
select a first pattern of a group of taps including a peak tap corresponding to the peak correlation value at the center of the first pattern of the group of taps,
select a second pattern of a group of taps including the peak tap corresponding to the peak correlation value at the center of the second pattern of the group of taps;
calculate a sum of the correlation values of the group of taps for each of the first pattern and the second pattern; and
select the one or more filter taps based on the sum of the correlation values.

8. A method comprising:
selecting an interference function based on center frequencies of a first transmitter configured to transmit a first signal, a second transmitter configured to transmit a second signal, and a receiver configured to receive a downlink signal, the downlink signal comprising a desired signal and an interference signal corresponding to the first signal and the second signal;
calculating correlation values based on a first delay between the receiver and a reference transmitter from among the first and second transmitters, and a second delay between the first and second transmitters, the first delay and the second delay being used as inputs to calculate the correlation values based on the selected interference function;
selecting one or more filter taps based on the calculated correlation values;
estimating the interference signal based on the selected one or more filter taps and the interference function;
determining the desired signal from the downlink signal according to the estimated interference signal; and
transmitting the desired signal.

9. The method of claim 8, further comprising storing the calculated correlation values in a 2D structure,
wherein the stored correlation values are used for the selecting of the one or more filter taps.

10. The method of claim 9, wherein the 2D structure comprises:

a plurality of first time delay offset candidates for the first delay between the receiver and the reference transmitter along a first axis;

a plurality of second time delay offset candidates for the second delay between the first and second transmitters along a second axis; and a correlation value from among the calculated correlation values for each pair of the first and second time delay offset candidates.

11. The method of claim 9, wherein to generate the 2D structure, the method further comprises:

calculating the correlation values for a plurality of first time delay offset candidates stored in a first buffer based on one second time delay offset candidate stored in a second buffer for a first time instance;

determining a current peak correlation value from among the calculated correlation values for the first time instance;

comparing a difference between the current peak correlation value for the first time instance and a previous correlation value stored in the 2D structure for a previous time instance with a threshold; and storing the current peak correlation value in the 2D structure based on the comparing.

12. The method of claim 11, wherein:

in response to a determination that the difference is greater than the threshold, the 2D structure is reset, and at least the current peak correlation value is stored in the 2D structure; and in response to a determination that the difference is less than the threshold, the current peak correlation value is added to the 2D structure including at least the previous correlation value.

13. The method of claim 9, wherein the selecting the one or more filter taps comprises:

identifying n number of strongest correlation values from the 2D structure, where n is a natural number;

determining tap indices of the n number of strongest correlation values;

selecting terms for the interference function based on the tap indices;

estimating channel coefficients based on the tap indices and the selected terms; and estimating the interference signal based on the estimated channel coefficients.

14. The method of claim 9, wherein the selecting of the one or more filter taps comprises:

identifying a peak correlation value from the 2D structure;

selecting a first pattern of a group of taps including a peak tap corresponding to the peak correlation value at the center of the first pattern of the group of taps, selecting a second pattern of a group of taps including the peak tap corresponding to the peak correlation value at the center of the second pattern of the group of taps;

calculating a sum of the correlation values of the group of taps for each of the first pattern and the second pattern; and selecting the one or more filter taps based on the sum of the correlation values.

15. Non-transitory computer readable medium storing instructions that, when executed, cause a communication device to:

select an interference function based on center frequencies of a first transmitter configured to transmit a first signal, a second transmitter configured to transmit a second signal, and a receiver configured to receive a downlink signal, the downlink signal comprising a desired signal and an interference signal corresponding to the first signal and the second signal;

calculate correlation values based on a first delay between the receiver and a reference transmitter from among the first and second transmitters, and a second delay between the first and second transmitters, the first delay and the second delay being used as inputs to calculate the correlation values based on the selected interference function;

store the calculated correlation values in a 2D structure;

select one or more filter taps based on the correlation values stored in the 2D structure;

estimate the interference signal based on the selected one or more filter taps and the interference function;

determine the desired signal from the downlink signal according to the estimated interference signal; and transmit the desired signal.

16. The computer readable medium of claim 15, wherein the 2D structure comprises:

a plurality of first time delay offset candidates for the first delay between the receiver and the reference transmitter along a first axis;

a plurality of second time delay offset candidates for the second delay between the first and second transmitters along a second axis; and a correlation value from among the calculated correlation values for each pair of the first and second time delay offset candidates.

17. The computer readable medium of claim 15, wherein to generate the 2D structure, the instructions further cause the communication device to:

calculate the correlation values for a plurality of first time delay offset candidates stored in a first buffer based on one second time delay offset candidate stored in a second buffer for a first time instance;

determine a current peak correlation value from among the calculated correlation values for the first time instance;

compare a difference between the current peak correlation value for the first time instance and a previous correlation value stored in the 2D structure for a previous time instance with a threshold; and store the current peak correlation value in the 2D structure based on the compare.

18. The computer readable medium of claim 17, wherein to generate the 2D structure, the instructions further cause the communication device to:

in response to a determination that the difference is greater than the threshold, rest the 2D structure, and store at least the current peak correlation value in the 2D structure; and in response to a determination that the difference is less than the threshold, add the current peak correlation value to the 2D structure including at least the previous correlation value.

19. The computer readable medium of claim 15, wherein to select the one or more filter taps, the instructions further cause the communication device to:

identify n number of strongest correlation values from the 2D structure, where n is a natural number;

determine tap indices of the n number of strongest correlation values;

select terms for the interference function based on the tap indices;

estimate channel coefficients based on the tap indices and the selected terms; and estimate the interference signal based on the estimated channel coefficients.

20. The computer readable medium of claim 15, wherein to select the one or more filter taps, the instructions further cause the communication device to:

identify a peak correlation value from the 2D structure;

select a first pattern of a group of taps including a peak tap corresponding to the peak correlation value at the center of the first pattern of the group of taps, select a second pattern of a group of taps including the peak tap corresponding to the peak correlation value at the center of the second pattern of the group of taps;

calculate a sum of the correlation values of the group of taps for each of the first pattern and the second pattern; and select the one or more filter taps based on the sum of the correlation values.

* * * * *